(12) United States Patent
Hayashi et al.

(10) Patent No.: US 9,164,349 B2
(45) Date of Patent: Oct. 20, 2015

(54) OPTICAL SEMICONDUCTOR MODULATOR DEVICE AND OPTICAL MODULE

(71) Applicant: OCLARO JAPAN, INC., Kanagawa (JP)

(72) Inventors: Hiroaki Hayashi, Yamaguchi (JP); Hideo Arimoto, Tokyo (JP)

(73) Assignee: Oclaro Japan, Inc., Kanagawa (JP)

( * ) Notice: Subject to any disclaimer, the term of this patent is extended or adjusted under 35 U.S.C. 154(b) by 297 days.

(21) Appl. No.: 13/765,220

(22) Filed: Feb. 12, 2013

(65) Prior Publication Data

US 2013/0209021 A1 Aug. 15, 2013

(30) Foreign Application Priority Data

Feb. 14, 2012 (JP) ................................ 2012-029784

(51) Int. Cl.
*G02F 1/225* (2006.01)
*G02F 1/01* (2006.01)
*G02B 6/293* (2006.01)
*G02B 6/12* (2006.01)
*G02F 1/21* (2006.01)

(52) U.S. Cl.
CPC .......... *G02F 1/2257* (2013.01); *G02B 6/12007* (2013.01); *G02F 1/011* (2013.01); *G02F 1/225* (2013.01); *G02B 6/29352* (2013.01); *G02B 2006/12159* (2013.01); *G02F 2001/212* (2013.01)

(58) Field of Classification Search
None
See application file for complete search history.

(56) References Cited

U.S. PATENT DOCUMENTS

| 4,368,645 | A | 1/1983 | Glenn et al. |
| 8,116,635 | B2* | 2/2012 | Tanimura et al. ............. 398/184 |
| 2003/0030876 | A1 | 2/2003 | Takei |
| 2007/0047969 | A1 | 3/2007 | Nakashima et al. |
| 2009/0245795 | A1* | 10/2009 | Joyner et al. .................... 398/79 |
| 2009/0274469 | A1 | 11/2009 | Yuki et al. |
| 2009/0279891 | A1* | 11/2009 | Yu .................................. 398/65 |

(Continued)

FOREIGN PATENT DOCUMENTS

| JP | 57-86730 A | 5/1982 |
| JP | 2003-60578 A | 2/2003 |

(Continued)

OTHER PUBLICATIONS

J.J.G.M. van der Tol et al.; "Realization of a Short Integrated Optic Passive Polarization Converter"; IEEE Photonics Technology Letters; Aug. 1995; pp. 893-895; vol. 7; No. 8.

(Continued)

*Primary Examiner* — Michelle R Connelly
(74) *Attorney, Agent, or Firm* — Mattingly & Malur, PC

(57) ABSTRACT

In an optical semiconductor device related to the present invention, a first light source outputting light having a first polarization, a second light source outputting light having a second polarization, a first optical modulator being optically connected to an output side of the first light source and modulating the light that is output from the first light source to output a light signal, a second optical modulator being optically connected to an output side of the second light source and modulating the light that is output from the second light source to output a light signal, and an optical multiplexer coupling the light signal that is output from the first optical modulator with the light signal that is output from the second optical modulator to output a coupled light signal, are integrated on a semiconductor substrate together.

15 Claims, 16 Drawing Sheets

(56) References Cited

U.S. PATENT DOCUMENTS

| | | | |
|---|---|---|---|
| 2010/0067914 A1* | 3/2010 | Tanaka et al. | 398/102 |
| 2010/0067918 A1* | 3/2010 | Federici et al. | 398/158 |
| 2010/0080571 A1* | 4/2010 | Akiyama et al. | 398/184 |
| 2010/0150555 A1* | 6/2010 | Wang et al. | 398/65 |
| 2010/0215374 A1* | 8/2010 | Liu et al. | 398/98 |
| 2010/0284644 A1* | 11/2010 | Sugamata | 385/2 |
| 2010/0303469 A1* | 12/2010 | Barton et al. | 398/184 |
| 2010/0316074 A1 | 12/2010 | Fukuda | |
| 2011/0044702 A1* | 2/2011 | Mizuguchi et al. | 398/184 |
| 2011/0200062 A1 | 8/2011 | Shibata et al. | |
| 2012/0050844 A1* | 3/2012 | Nishihara et al. | 359/337.13 |
| 2012/0134676 A1* | 5/2012 | Kikuchi | 398/65 |
| 2012/0177384 A1* | 7/2012 | Ryf | 398/202 |
| 2012/0189307 A1* | 7/2012 | Salsi et al. | 398/65 |
| 2012/0207474 A1 | 8/2012 | Inoue et al. | |
| 2013/0011093 A1* | 1/2013 | Goh et al. | 385/3 |
| 2013/0039370 A1 | 2/2013 | Shibata et al. | |
| 2014/0016894 A1* | 1/2014 | Evans et al. | 385/2 |

FOREIGN PATENT DOCUMENTS

| | | |
|---|---|---|
| JP | 2005-172975 A | 6/2005 |
| JP | 2007-67902 A | 3/2007 |
| JP | 2008-76752 A | 4/2008 |
| JP | 2009-272694 A | 11/2009 |
| JP | 2010-50135 A | 3/2010 |
| JP | 2011-3591 A | 1/2011 |
| JP | 4701232 B2 | 3/2011 |
| JP | 2011-171472 A | 9/2011 |
| JP | 2011-176070 A | 9/2011 |
| WO | 2011/027895 A1 | 3/2011 |

OTHER PUBLICATIONS

Japanese Office Action received in corresponding Japanese Application No. 2012-029784 dated Aug. 25, 2015.

* cited by examiner

OPTICAL SEMICONDUCTOR MODULATOR DEVICE AND OPTICAL MODULE

CROSS-REFERENCE TO RELATED APPLICATION

The present application claims priority from Japanese application JP 2012-029784, filed on Feb. 14, 2012, the content of which is hereby incorporated by reference into this application.

BACKGROUND OF THE INVENTION

1. Field of the Invention

The present invention relates to a polarization multiplexing type optical semiconductor modulator device, and an optical module including the same. Particularly, the present invention relates to an improvement in characteristics of a polarization multiplexing type semiconductor optical integrated device.

BACKGROUND ART

2. Description of the Related Art

In recent years, optical modulator devices have been used which realize the polarization multiplexing type. In the related art, such optical modulators mainly include a demultiplexer, two modulators, a polarization rotator, and a polarization multiplexer. Input light is divaricated into two beams of light having the same polarization by a demultiplexer. The two beams of light are each input to the modulator and are each converted into light signals. Of two waveguides through which the two light signals are transmitted, one waveguide is provided with the polarization rotator, and one light signal is converted by the polarization rotator into a light signal having a different polarization. The two light signals are multiplexed by the polarization multiplexer, and become a polarization multiplexing light signal.

SUMMARY OF THE INVENTION

An example of the optical modulator using the polarization rotator is disclosed in Japanese Patent No. 4701232. FIG. 14 is a schematic view that illustrates an example of an optical modulator related to the related art. The optical modulator illustrated in FIG. 14 is a Dual Polarization Quadrature Phase Shift Keying type optical modulator (hereinafter, referred to as DP-QPSK modulator). A DP-QPSK modulator 101 has a demultiplexer 102, modulation areas 103 (two QPSK modulators), a polarization rotator 104, and a polarization multiplexer 105. Herein, each of two QPSK modulators has two Mach-Zehnder modulators (MZ modulators 106), and the DP-QPSK modulator 101 has four MZ modulators 106 in total.

Continuous light (IN), which is input from a left side of the figure, is first divaricated into two beams of light by the demultiplexer 102, and then each divaricated light is made to diverge into two further beams of light by the QPSK modulators. In each of the QPSK modulators, the two-divaricated beams of light generate a phase difference relative to each other in each of the QPSK modulators by being wave-guided through the waveguide subjected to the refractive index change by the modulated signal, and a phase modulated signal is generated by multiplexing the beams of light. By performing the polarization rotation of one modulated light signal so as to have the polarization different from the other modulated light signal using the polarization rotator 104, two phase modulated signals having the different polarizations are generated. Finally, two phase modulated signals are multiplexed by the polarization multiplexer 105, and the polarization-multiplexing phase-modulated signal is output to a right side of the figure (OUT).

In recent years, there has been demand for cost-saving, size-saving, and electric power consumption-saving and the like. Therefore, integrated devices are preferable in which each optical component of the polarization multiplexing type optical modulator is integrated on the same substrate. By providing the integrated devices in which each optical component is integrated on the same substrate, the number of the components can be reduced, and coupling loss can be reduced. A polarization rotator constituted by a semiconductor for integrating the polarization rotator is disclosed in IEEE Photonics Technology Letters, Vol. 7, No. 8, 1995, p 893 to 895. However, as disclosed in the above-mentioned document, when manufacturing the polarization rotator with a semiconductor, the optical loss increases, and there is a problem that it is difficult to raise the polarization extinction ratio.

Furthermore, there is also a problem that yield decreases due to manufacturing errors in the polarization rotator. When the polarization rotator serving as an optical component having the low yield is integrated on the same substrate together with other optical components, the yield of the integrated device also decreases, which makes it difficult to reduce the costs. Furthermore, it is possible to improve the yield of the polarization rotator by adjusting an amount of the polarization rotation of the polarization rotator by causing an electrical refractive index change. However, for that reason, there is a need to place one more electric power source, the testing costs rise, and in this case, the reduction in costs is difficult.

In addition, as illustrated in FIG. 14, light is input (IN) to the DP-QPSK modulator 101 from a light source (not illustrated) provided outside, and the DP-QPSK modulator 101 outputs (OUT) the polarization-multiplexing phase-modulated signal to the outside. In order to optically combine the external light source with the DP-QPSK modulator 101, there is a need for an optical component called a collimator lens, which makes it difficult to save on the costs and the size, and the optical loss occurs in the coupled location, which hinders the electric power consumption saving. Therefore, even though the integrated device in which the light source and the optical modulator are integrated on the same substrate is desirable, it is more difficult to integrate many components due to including the optical components having a low yield.

The present invention has been made in view of such problems, and an object thereof is to provide a polarization multiplexing type optical semiconductor device having improved characteristics, and an optical module including the same.

(1) In order to solve the above-mentioned problems, according to an aspect of the present invention, there is provided an optical semiconductor device in which a first light source, a second light source, a first optical modulator, a second optical modulator, and an optical multiplexer are integrated on a semiconductor substrate together, wherein the first light source outputs light having a first polarization, the second light source outputs light having a second polarization different from the first polarization, the first optical modulator is optically connected to an output side of the first light source and modulates the light which is output from the first light source to output an light signal, the second optical modulator is optically connected to an output side of the second light source and modulates the light which is output from the second light source to output an light signal, and the optical multiplexer couples the light signal which is output from the first optical modulator with the light signal which is output from the second optical modulator to output a coupled light signal.

(2) In the optical semiconductor device described in (1), at least one of the first light source and the second light source is a wavelength-tunable laser, and the first light source and the second light source may be able to cause a wavelength of the light, which is output from any one light source of the first light source and the second light source, to approach a wavelength of the light which is output from the other light source thereof.

(3) In the optical semiconductor device described in (2), the wavelength-tunable laser may be a distribution feedback type laser that includes a resistor for adjusting the wavelength of the light to be output by a temperature.

(4) In the optical semiconductor device described in (2), the wavelength-tunable laser may be a distributed Bragg reflector type laser or a lateral grating assisted lateral co-directional coupler type laser.

(5) In the optical semiconductor device described in any one of (1) to (4), the optical semiconductor device may further include an element having wavelength dependence that is optically connected to each of the first light source and the second light source, detects whether or not there is a difference in wavelengths of the light that is each output from the first light source and the second light source; and an optical receiver that is optically connected to the element having the wavelength dependence, and detects the light so that the element converts the beams of light that are each output from the first light source and the second light source.

(6) In the optical semiconductor device described in (5), the element having the wavelength dependence may be any one of a ring resonator and a Mach-Zehnder type delay interferometer.

(7) In the optical semiconductor device described in (5), the element having the wavelength dependence may be a ring resonator and the optical semiconductor device may further include a first optical waveguide that is optically connected to the first light source, a second optical waveguide that is optically connected to the second light source, a first multi-mode interference type multiplexer/demultiplexer that optically couples the first optical waveguide with the ring resonator, and a second multi-mode interference type multiplexer/demultiplexer that optically couples the second optical waveguide with the ring resonator.

(8) In the optical semiconductor device described in (7), effective refractive indexes of the first multi-mode interference type multiplexer/demultiplexer and the second multi-mode interference type multiplexer/demultiplexer may be changed along an optical axial direction.

(9) An optical module related to the present invention may include the optical semiconductor device described in any one of (1) to (8).

(10) The optical module related to the present invention may include the optical semiconductor device described in any one of (5) to (8), and a control unit that controls the first light source and/or the second light source so as to allow the wavelength of the light that is output from any one light source of the first light source and the second light source to approach the wavelength of the light that is output from the other light source thereof, based on the signal detected by the optical receiver.

(11) In the optical module described in (10), the second light source may be a wavelength-tunable laser, the control unit may superimpose a first dither signal on a signal for controlling a light output of the first light source, may extract a signal detected by the optical receiver at a frequency of the first dither signal, and may control the element having the wavelength dependence so as to have predetermined characteristics corresponding to the wavelength of the first light source, and the control unit may superimpose a second dither signal having a frequency different from that of the first dither signal on a signal for controlling the second light source, may extract the signal detected by the optical receiver at a frequency of the second dither signal, and may control the wavelength of the second light source so as to be within a predetermined range corresponding to the predetermined characteristics of the element having the wavelength dependence.

(12) In the optical module described in (10), the first light source and the second light source may be each a wavelength-tunable laser, and the control unit may superimpose a first dither signal on a signal for controlling the first light source, may superimpose a second dither signal having a frequency different from that of the first dither signal on a signal for controlling the second light source, may extract a signal detected by the optical receiver at the frequency of the first dither signal and the frequency of the second dither signal, respectively, and may control the wavelength of the first light source and the wavelength of the second light source so as to be within a predetermined range corresponding to the predetermined characteristics of the element having the wavelength dependence, respectively.

(13) In the optical module described in (10), the second light source may be a wavelength-tunable laser, the optical semiconductor device may further include a first optical intensity receiver that is optically connected to the first light source on a side of the first light source opposite to the first optical modulator and detects intensity of the light that is output from the first light source, and a second optical intensity receiver that is optically connected to the second light source on a side of the second light source opposite to the second optical modulator and detects intensity of the light that is output from the second light source, the control unit may apply a predetermined bias voltage for detecting the wavelength of the first light source to each of the first optical intensity receiver and the second optical intensity receiver in a time slot corresponding to the first light source, and may control the element having the wavelength dependence so as to have predetermined characteristics corresponding to the wavelength of the first light source based on the signal detected by the optical receiver, and the control unit may apply a predetermined bias voltage for detecting the wavelength of the second light source to each of the first optical intensity receiver and the second optical intensity receiver in a time slot corresponding to the second light source, and may control the wavelength of the second light source so as to be within a predetermined range corresponding to the predetermined characteristics of the element having the wavelength dependence, based on the signal detected by the optical receiver.

(14) In the optical module described in (10), the first light source and the second light source may be each a wavelength-tunable laser, the optical semiconductor device may further include a first optical intensity receiver that is optically connected to the first light source on a side of the first light source opposite to the first optical modulator and detects intensity of the light that is output from the first light source, and a second optical intensity receiver that is optically connected to the second light source on a side of the second light source opposite to the second optical modulator and detects intensity of the light that is output from the second light source, the control unit may apply a predetermined bias voltage for detecting the wavelength of the first light source to each of the first optical intensity receiver and the second optical intensity receiver in a time slot corresponding to the first light source, and may control the wavelength of the light that is output from the first light source so as to be within a predetermined range corresponding to the characteristics of the element having the wavelength dependence based on the signal detected by the optical receiver, and the control unit may apply a predetermined bias voltage for detecting the wavelength of the second light source to each of the first optical intensity receiver and the second optical intensity receiver in a time slot corresponding to the second light source, and may control the wavelength of the light that is output from the second light source so as to be within a predetermined range corresponding to the characteristics of the element having the wavelength dependence, based on the signal detected by the optical receiver.

(15) In the optical module described in (10), the first light source and the second light source may be each a wavelength-tunable laser, and the control unit may extract a beat signal generated by interference between the light that is output from the first light source and the light that is output from the second light source in the element having the wavelength dependence from the signal detected by the optical receiver, and may control the wavelength of the first light source and the wavelength of the second light source so as to each be within a predetermined range corresponding to the predetermined characteristics of the element having the wavelength dependence.

According to the present invention, a polarization multiplexing type optical semiconductor device having improved characteristics and an optical module including the same are provided.

DETAILED DESCRIPTION OF THE INVENTION

Figure 1:
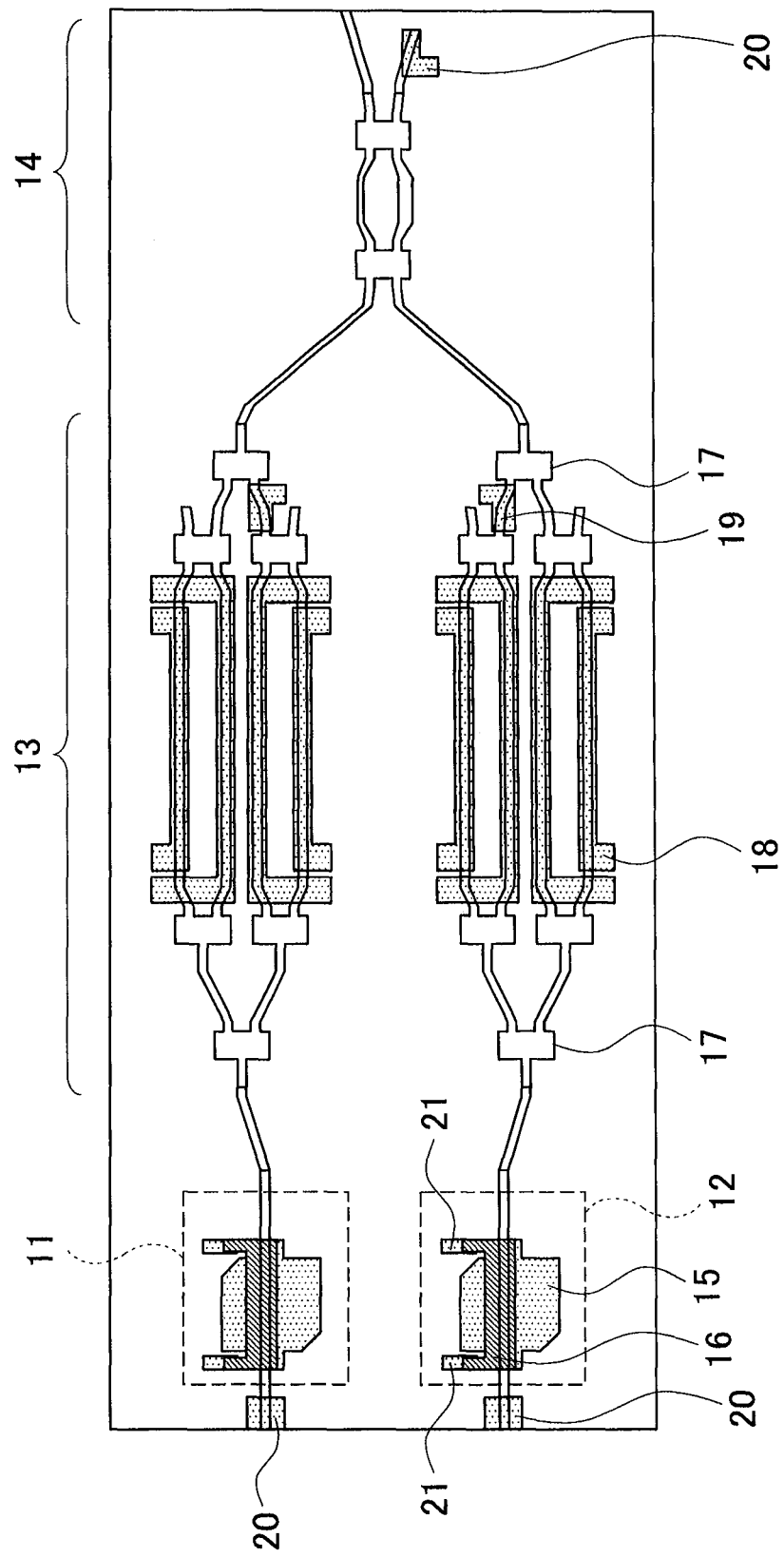
FIG. 1 is a schematic top view of an optical semiconductor device related to a first embodiment of the present invention.

Hereinafter, embodiments of the present invention will be described specifically and in detail based on the drawings. In addition, in the whole views for describing the embodiments, members having the same function are denoted by the same reference numerals, and the repeated descriptions thereof will be omitted. Furthermore, in the embodiments described below, unless it is particularly necessary, the descriptions of the same or similar parts are not repeated as a general rule.

In addition, in the following examples, although an example is described in which, as two light sources configured to output the beams of light having different polarizations, two wavelength-adjustable distributed feedback (DFB) laser diodes (hereinafter, referred to as LD), a distributed Bragg reflector (DBR) LD, and a lateral grating assisted lateral co-directional coupler (LGLC) LD are integrated, two light sources capable of adjusting the wavelengths, outputting the beams of light having the different polarizations, and being integrated on the same semiconductor substrate may be used, without being limited thereto. Furthermore, as an optical component for detecting whether or not there is a difference in the wavelengths of the two light sources, the ring resonator and the MZ type delay interferometer are described as an example, but the resonator may be, for example, a Fabry-Perot (FP) type resonator, and if a device (element) has the wavelength dependence, the device is not limited to the resonator. In addition, although the optical receiver uses a photo diode (Photo Diode: hereinafter, referred to as PD) from simplicity of the integration, the present invention is not limited thereto. Materials, compositions, mesa stripe dimensions, a film thickness and a semiconductor substrate described below are examples for easily understanding the present invention, but the present invention is not limited thereto. For the purpose of simplifying the understanding, for example, a passivation film, an electrode or the like are omitted unless there is a special effect such as the use as a variable heat source.

First Embodiment

FIG. 1 is a schematic top view of an optical semiconductor device related to a first embodiment of the present invention. The optical semiconductor device related to the embodiment is a semiconductor optical integrated device in which two LDs, two QPSK modulators (modulation areas 13), a polarization multiplexer 14, and three PDs 20 are included on the same substrate. Herein the two LDs are a first LD 11 (a first light source) configured to output light having a TE polarization (a first polarization), and a second LD 12 (a second light source) configured to output light having a TM polarization (a second polarization), and both of them are distributed feedback type (DFB) LDs capable of adjusting the wavelength. In addition, the first LD 11 and the second LD 12 include a LD electrode 15 on a device surface thereof, and include a thin film resistor 16 formed by covering a part of the upper surface of the LD electrode 15. Two electrode pads 21 are provided on both ends of the thin film resistor 16, and electric current flows through the thin film resistor 16 and the thin film resistor 16 generates heat by applying the voltage between the two electrode pads 21. The thin film resistor 16 is a variable heat source in which an amount of heat generation is controlled by controlling the flowing electric current, and the two LDs are wavelength-tunable LDs capable of adjusting the wavelength by controlling the temperature using the thin film resistor 16. That is, the thin film resistor 16 is a resisting element for adjusting the wavelength of the light that is output from the LDs by the temperature. Furthermore, a PD 20 serving as a light output monitor is placed on a side of each LD opposite to the modulator side, and is optically connected to the corresponding LD. Like the TE polarization and the TM polarization, the first polarization and the second polarization are two polarizations that are different from each other. Although it is preferable that the first polarization and the second polarization be orthogonal to each other in view of characteristics of the element, the present invention is not limited thereto.

In addition, it is preferable that two PDs 20 used as the light output monitor be integrated on the same substrate as two light sources and two modulators from the viewpoint of the reduction of the optical component and the reduction of the coupling loss. However, the two PDs 20 do not necessarily need to be integrated on the same substrate, but may be placed as separate elements. Furthermore, herein, although a case is described where two sets of the light sources and the modulators are integrated on the same substrate, a plurality of sets of three or more may be arranged on the same substrate, without being limited thereto.

Figure 14:
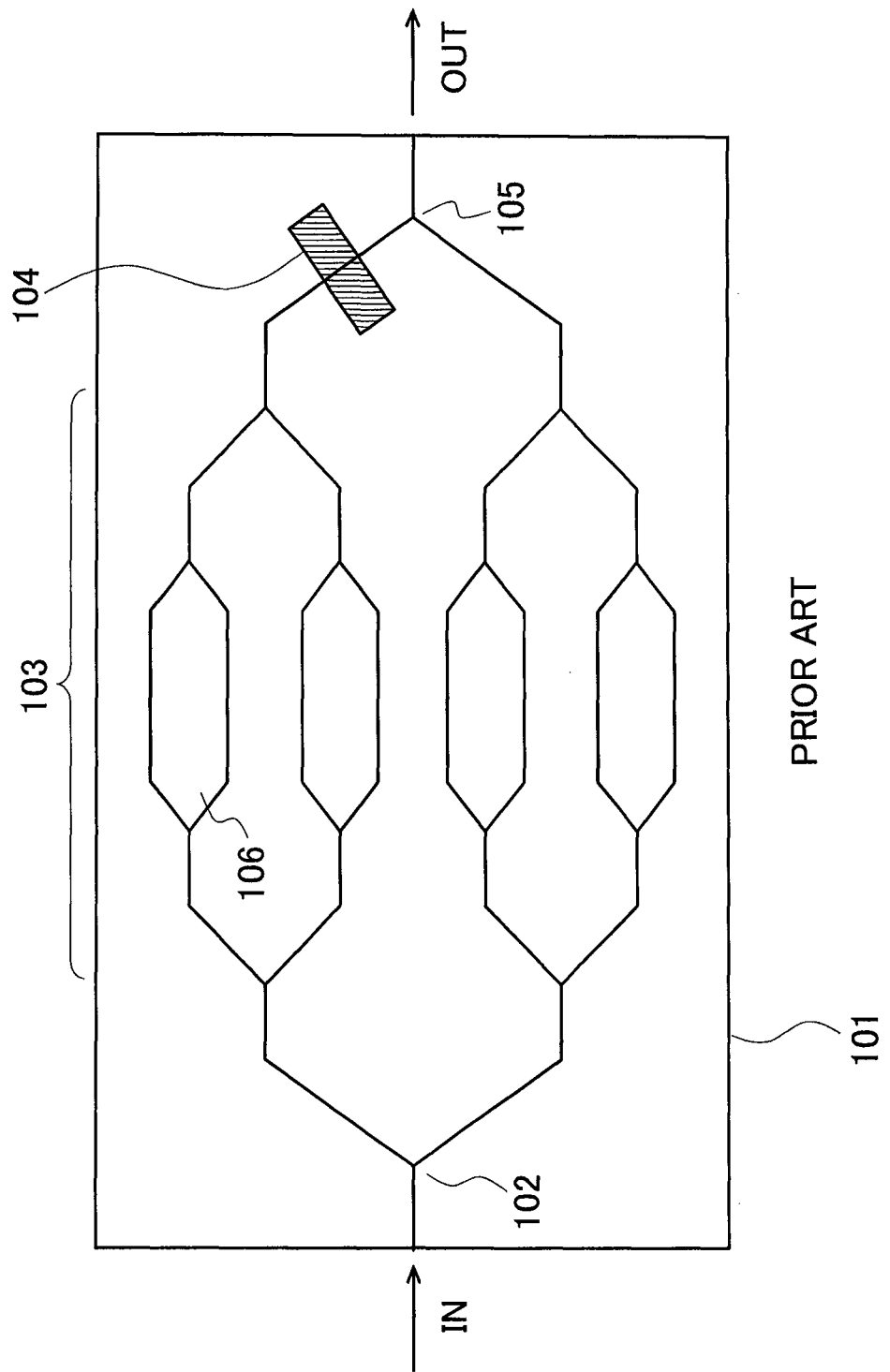
FIG. 14 is a schematic view that illustrates an example of an optical modulator related to the related art.

Two QPSK modulators are included in the modulation area 13, and constitute a DP-QPSK modulator together with the polarization multiplexer 14 placed at the output side. Unlike the optical modulator illustrated in FIG. 14, a demultiplexer and a polarization rotator are not included, and each QPSK modulator is optically connected to the corresponding LD via the waveguide. Herein, an upper QPSK modulator of the figure connected to the first LD 11 is a first optical modulator, and a lower QPSK modulator of the figure connected to the second LD 12 is a second optical modulator.

One QPSK modulator includes two MZ modulators arranged in parallel, and MMI multiplexer/demultiplexer 17 (multi-mode interference type multiplexer/demultiplexer) placed in front of and behind the modulators. An electrode 18 is formed on a device surface of the MZ modulator. Furthermore, a phase shifter 19 is placed on an output terminal of one MZ modulator. By controlling the voltage (high frequency electrical signal) applied to the electrode 18 of the MZ modulator, in the two QPSK modulators of the modulation area 13, the light of the TE polarization and the light of the TM polarization are modulated, each of the beams of light are converted into the light signal of the TE polarization and the light signal of the TM polarization, and the signals are output to the polarization multiplexer 14.

On one of the output terminals of the polarization multiplexer 14, the PD 20 is provided for a modulated light output monitor. In the polarization multiplexer 14, a light signal (a phase modulated signal) of the TE polarization and a light signal (a phase modulated signal) of the TM polarization are multiplexed (coupled) with each other, the multiplexed coupled light signal (the polarization-multiplexing phase-modulated signal) is output to the outside (the right side of the figure) from the other of the output terminals.

Figure 2:
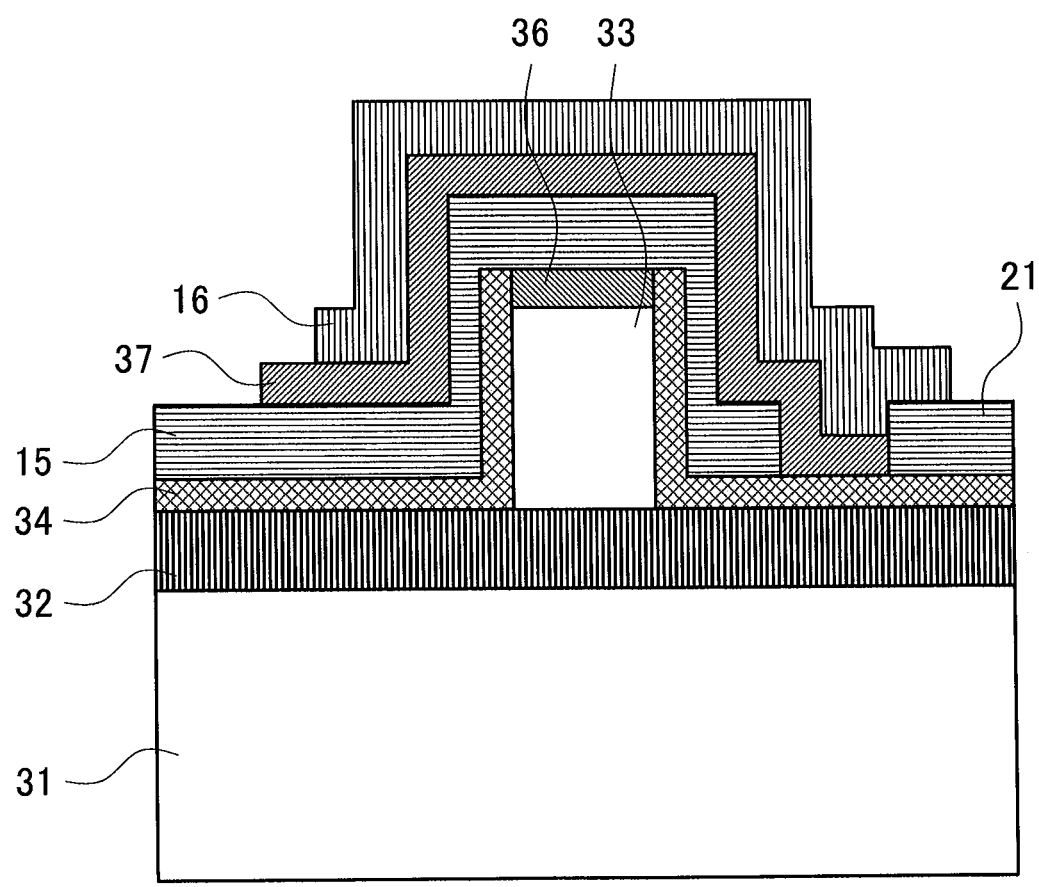
FIG. 2 is a cross-sectional view that illustrates a structure of a LD related to the first embodiment of the present invention.

FIG. 2 is a cross-sectional view that illustrates the structure of the LD related to the present embodiment. As illustrated in FIG. 2, the LD related to the present embodiment is configured so that an n type InP clad layer 31, an InGaAsP guide layer (not illustrated), an active layer 32, an InGaAsP guide layer (not illustrated), a P type InP spacer layer (not illustrated), a diffraction grating layer (not illustrated), a p type InP clad layer 33, and a P type contact layer 36 are sequentially laminated on an n type InP semiconductor substrate. Herein, the active layer 32 includes an InGaAsP multiple quantum well (MQW) layer. the p type InP spacer layer, the diffraction grating layer, the p type InP clad layer 33, and the p type contact layer 36 are configured so that both sides of the region serving as the waveguide are removed to form a mesa structure. A first passivation film 34 is formed by covering both sides of the mesa structure and an area in which the mesa structure is not formed in an upper layer of the active layer 32, and the LD electrode 15 serving as the p type electrode is formed by covering the first passivation film 34 and the uppermost layer of the mesa structure (the p type contact layer 36). The LD electrode 15 is electrically connected to the active layer 32, by coming into contact with the p type contact layer 36. A second passivation film 37 is formed on the LD electrode 15, and the thin film resistor 16 is formed on the second passivation film 37. The LD electrode 15 and the thin film resistor 16 are electrically cut off from each other by the second passivation film 37. In addition, the electrode pad 21 is formed so as to be connected to each side of the thin film resistor 16 on the passivation film 34. The electrode pads 21 are electrically cut off from the LD electrode 15.

Generally, an energy band of a well layer without the distortion is degenerated, and since a transition between an electron and a heavy hole is important, the well layer outputs the light of the TE polarization. If the distortion is introduced into the well layer, since the degeneration of the heavy hole and the light hole is removed, and a transition rate between the heavy hole and the light hole is changed, it is known that gains of each polarization can be adjusted. If a compression distortion is introduced into the well layer, the light of the TE polarization is further output, and when a tension distortion is introduced into the well layer, the light of the TM polarization is further output.

Herein, in the first LD 11 configured to output the light of the TE polarization, for the purpose of the gain of the TE polarization, in the well layer included in the active layer 32, the compression distortion or no distortion is preferable. It is possible to control the oscillating polarization by adjusting a direction of the distortion and an amount of the distortion of the well layer of the active layer 32.

Next, a manufacturing method of the first LD 11 will be described in brief. After performing a crystal growth of the n type InP clad layer 31 to the diffraction grating layer on the n type InP semiconductor substrate in a lump, for example, using a metalorganic vapor phase epitaxy (MOVPE) method or the like, the diffraction grating pattern is formed by photolithography in accordance with a design oscillation wavelength according to the TE polarization, and then, the diffraction grating with a pitch of about 0.24 μm in an optical axial direction is formed by using etching. Next, the p type InP clad layer 33 and the p type contact layer 36 are formed by regrowth, and the mesa stripe is formed so as to have a required mesa stripe width by photolithography and etching. Thereafter, the first passivation film 34 and the LD electrode 15 are formed by a chemical vapor deposition (CVD) method and an ED vapor deposition. The processes up to this stage are performed by the same method as the DFB-LD of the related art. In the LD related to the present embodiment, the electrode pads 21 for injecting the electric current into the thin film resistor 16 formed later are formed next to the LD electrode 15. Thereafter, in order to prevent the electric current from flowing between the LD electrode 15 and the thin film resistor 16, the second passivation film 37 is formed on the LD electrode 15, the thin film resistor 16 is formed thereon, and thus the first LD 11 is manufactured.

The structure of the second LD 12 configured to output the light of the TM polarization can have the same structure as that of the first LD 11 except for the diffraction grating and the active layer, and thus most of the manufacturing processes of the second LD 12 can be made common to the manufacturing processes of the first LD 11. Thus, points of the manufacturing method of the second LD 12 different from those of the first LD 11 will be described below. The oscillation wavelength of the second LD 12 matches with that of the first LD 11 or is within a predetermined range, and the diffraction grating of the second LD 12 is formed so as to output the light of the TM polarization. Furthermore, in order to output the light of the TM polarization, the tension distortion of the well layer contained in the active layer 32 of the second LD 12 is preferable. In order to suppress a wavelength difference due to a manufacturing difference, it is preferable to bring the effective refractive indexes of the waveguides between the polarizations as near to each other as possible.

The optical semiconductor device related to the present invention is characterized in that two light sources configured to output the beams of light having different polarizations are provided instead of providing a polarization rotation device, and each light source is optically connected to the corresponding modulator. With such a configuration, an integrate device is accomplished in which the light sources and the optical modulators are integrated on the same substrate. A polarization extinction ratio can be greatly improved by not providing the polarization rotator compared to a case where the polarization rotator is integrated. However, each of the light signals of different polarizations is generated from the beams of light that are output from the separate light sources. Thus, in order that both the light signals of the different polarizations obtain predetermined transmission characteristics, there is a need to precisely control both the wavelengths of the beams of light that are output from two light sources so as to be in a predetermined range. Herein, the two light sources need to be configured so that it is possible to allow the wavelength of the light output from one light source to approach the wavelength of the light output from the other light source. In addition, the two light sources are preferably configured so that it is possible to set the wavelength of the light output from one light source to be within a predetermined range described below with respect to the wavelength of the light output from the other light source. Furthermore, it is further preferable to enable the matching of the wavelengths of the beams of light output from the two light sources.

The wavelength precision required between the polarizations is defined by a wavelength assumption and a group delay (Differential Group Delay) at a reception side. If the precision of the wave control is on the order of several tens of pm, the wavelength assumption is possible due to the digital signal processing on the reception side. The delay time of the group delay in one channel is an amount of delay in which a chromatic dispersion (CD), due to a wavelength difference between the polarizations, is superimposed on the polarization mode dispersion (PMD). Since the CD is changed depending on the transmission distance and the upper limit thereof is determined by the time slot, the CD is limited by a baud rate. That is, if the CD is within the range limited by the transmission distance and the baud rate, almost equal transmission characteristics are exhibited in the light signal of the different polarizations.

Figure 3:
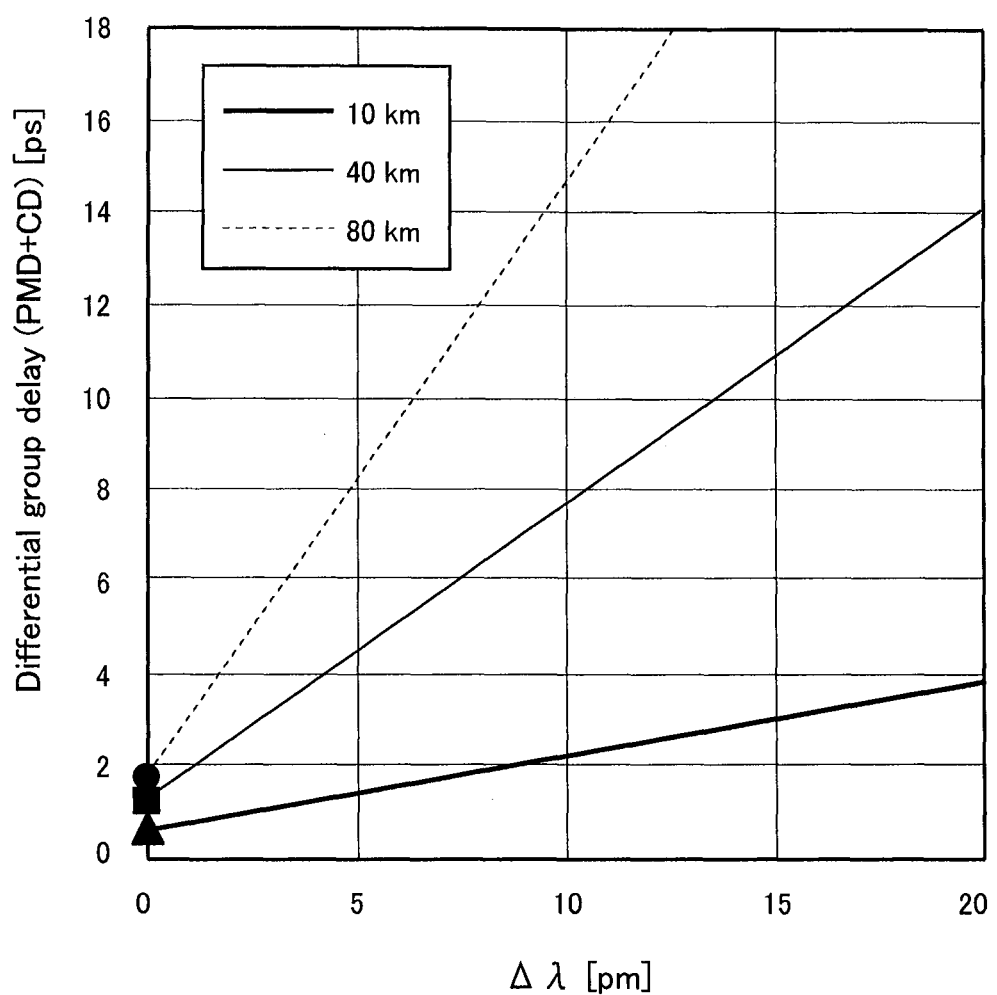
FIG. 3 is a calculation result of a group delay for a wavelength precision.

FIG. 3 is a calculation result of the group delay with respect to a wavelength precision $\Delta\lambda$. A horizontal axis of FIG. 3 is the wavelength precision $\Delta\lambda$ [μpm], and a vertical axis of FIG. 3 is the group delay time [ps]. FIG. 3 illustrates cases where the transmission distances are 10 km (a bold line), 40 km (a thin line) and 80 km (a broken line), respectively. Herein, the group delay time in a single mode optical fiber based on JIS C6835 and ITU-T G. 652 is calculated as an example, the delay due to the PMD is 0.2 $[ps/(km)^{1/2}]$, and the delay due to the CD with respect to the light signal of a 1550 nm band is 16 [ps/nm/km]. The delay time caused by PMD is expressed by a symbol indicated by a y-intercept in FIG. 3. That is, when the transmission distance is 10 km, the delay time is indicated by a symbol "▲", when the transmission distance is 40 km, the delay time is indicated by a symbol "■", and when the transmission distance is 80 km, the delay time is indicated by a symbol "●". The delay time due to the PMD is constant regardless of the wavelength precision $\Delta\lambda$. On the contrary, the delay time due to the CD increases in proportion to wavelength precision $\Delta\lambda$, and the slope thereof increases as the transmission distance becomes longer. Moreover, as mentioned above, since the group delay time is the sum of the delay time due to the PMD and the delay time due to the CD, the group delay time with respect to wavelength precision $\Delta\lambda$, becomes a straight line having a y-intercept which is the delay time due to the PMD and a slope of an origin delay time due to the CD in accordance with the transmission distance.

For example, when it is assumed that a permission delay with respect to the time slot is 0.1, and a permitted group delay is 2.5 ps, the time slot of up to 10 times the group delay is permitted. The range to 40 Gbaud corresponding to 25 ps is a transmittable baud rate. Similarly, the baud rate 25 Gbaud corresponds to the group delay 4 ps. In the baud rate 40 Gbaud, with respect to the permitted group delay, the ratio of the delay due to the PMD is great, and is limited to a short distance such as an interconnect in an optical communication. In the baud rate 25 Gbaud, the wavelength precision $\Delta\lambda$ required for the transmission distance of 10 km is 20 pm, the wavelength precision $\Delta\lambda$ required for the transmission distance of 40 km is 4 pm, and the wavelength precision $\Delta\lambda$ required for the transmission distance of 80 km is 2 pm. By setting the wavelength of the light output from one light source within a range of this wavelength precision with respect to the wavelength of the light output from the other light source, the two light sources each can obtain satisfactory transmission characteristics.

As mentioned above, in the optical semiconductor device related to the embodiment, there is a need to control the wavelengths of the light that are output from the two light sources to a predetermined range (precision). The optical semiconductor device related to the present embodiment includes the LD related to the embodiment, and it is possible to heat only the light source(s) of the optical semiconductor device by the injection electric current to the thin film resistor. Thus, it is possible to control the LD regardless of the temperature dependence of other optical components included in the device, and thus it is possible to control the wavelength of the light output from one light source so as to be within a predetermined range with respect to the wavelength of the light output from the other light source, without requiring a complicated configuration.

The LD related to the embodiment is a DFB-LD including the thin film resistor and is able to obtain a wavelength-tunable width of 4 nm or more. By the wavelength-tunable width of the light output from the LD being 4 nm or more, even when considering the wavelength difference due to the manufacturing process of the device, it is possible to set the wavelengths of the beams of light output from the two light sources within the above-mentioned predetermined range.

Figure 4:
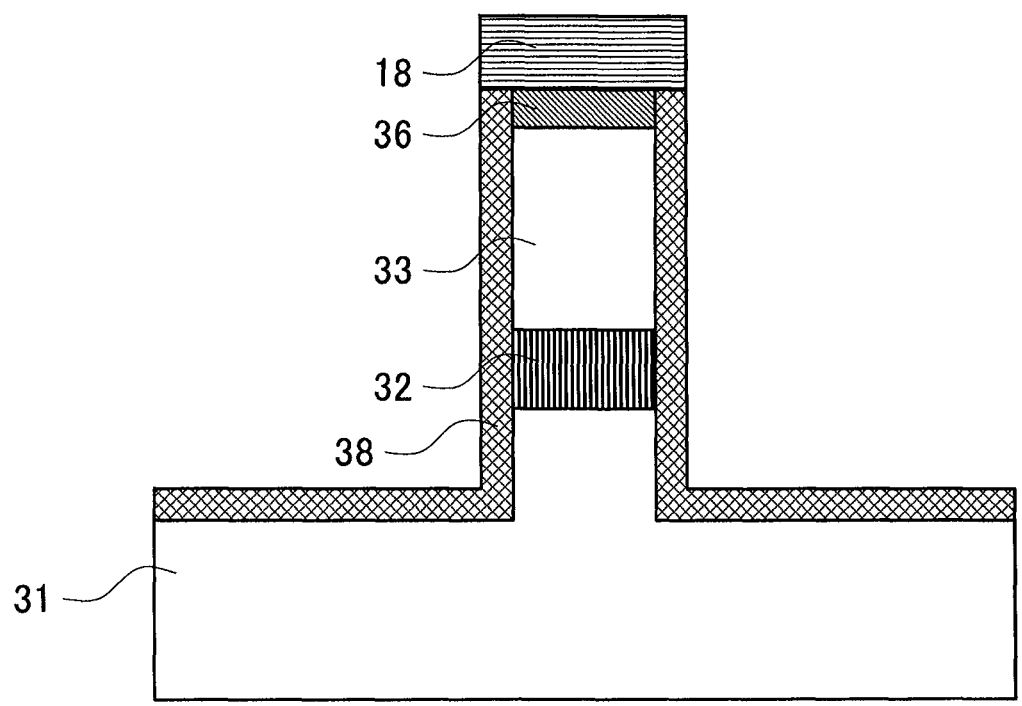
FIG. 4 is a cross-sectional view that illustrates a structure of a modulation area related to the first embodiment of the present invention.

FIG. 4 is a cross-sectional view that illustrates a structure of the modulation area 13 related to the present embodiment. In the MZ modulator of the modulation area 13, the refractive index change is caused by an electro-optic effect, and the input light is converted into the light signal. FIG. 4 illustrates one cross-section of the area where the refractive index change of the MZ modulator is caused. As illustrated in FIG. 4, an n type InP clad layer 31, an InGaAsP guide layer (not illustrated), an active layer 32, an InGaAsP guide layer (not illustrated), the p type InP clad layer 33, and the p type contact layer 36 are sequentially formed on the n type InP semiconductor substrate. In addition, the active layer 32 includes an InGaAsP multiple quantum well (MQW) layer. In order that the active layer 32 reduces the voltage required to cause a desired refractive index change, it is preferable to increase an optical confinement coefficient in the active layer 32, and in the MZ modulator related to the embodiment, there is provided a deep ridge structure in which the outside of the waveguide is etched. A passivation film 38 is formed by covering both sides of the mesa stripe of the deep ridge structure and an area in which the mesa stripe is not formed in the upper layer of the n type InP clad layer 31, and an electrode 18 serving as the p type electrode is formed above the uppermost layer (the p type contact layer 36) of the deep ridge structure.

The active layers 32 of the two MZ modulators may be adjusted in accordance with the corresponding polarization so that the two light signals of the different polarizations have the common modulation characteristics. Furthermore, if the modulation characteristics common to the active layers 32 of the two MZ modulators are obtained, the active layers 32 may be formed by other materials and structures. The beams of light that are each output from the two light sources (the first LD 11 and the second LD 12) are each made to divaricate by the MMI multiplexer/demultiplexer 17, and are finally made to diverge into four beams of light in the respective QPSK modulators. The travelling wave type high frequency electrical signal is transmitted to the electrode 18 formed above the mesa stripe of the deep ridge structure, the electric field is applied to the active layer located below the electrode 18, and thus the refractive index change is caused.

Each MZ modulator provided in the QPSK modulator performs the modulation equivalent to an I channel and a Q channel of a constellation map. Before mixing the waves of the I channel and the Q channel, the waves pass through a phase shifter 19 so that a phase difference of $\pi/2$ is generated between the I channel and the Q channel. The signals of the I channel and the Q channel are mixed by the MMI multiplexer/demultiplexer 17, and the light signal thereof is output to the polarization multiplexer 14 from the modulation area 13. Since the QPSK modulator and the polarization multiplexer 14 are optically connected to each other via the optical waveguide, the optical loss generated herein is reduced.

The polarization multiplexer 14 illustrated in FIG. 1 will be described. The polarization multiplexer 14 is a MZ interferometer constituted by the two intermediate waveguides and the MMI multiplexers/demultiplexers placed in front of and behind the same. The intermediate waveguides are preferably configured so that the refractive index does not depend on the polarization. Since the light signals of two different polarizations are each made to diverge by an input demultiplexer and each input to the two intermediate waveguides, a phase difference of $\pi/2$ is generated between the two intermediate waveguides. By forming the effective refractive indexes of the two intermediate waveguides so as to be different from each other depending on the polarizations, different phase differences are given to the different polarizations, so as to be guided to the same port. By setting the mesa stripe width of the two intermediate waveguides and the lengths of the intermediate waveguides so that the phase difference of $\pi/2$ is maintained in one polarization, and the other polarization has a phase difference of $\pi$, the different polarizations can be guided to the same output port. Herein, the mesa stripe width is 1.5 μm, the mesa stripe widths of the intermediate waveguides are 3.5 μm (lower side in the figure) and 1.0 μm (upper side of the figure), the intermediate waveguide length is 51 μm, the MMI multiplexer/demultiplexer width is 8.8 μm, and the MMI multiplexer/demultiplexer length is 115.0 μm. Herein, by setting the mesa stripe widths of the two intermediate waveguides to the different values, the effective refractive indexes of the two intermediate waveguides are set to be different from each other. However, the method of causing the difference of the effective refractive indexes due to the polarizations is not limited to the method of setting the mesa stripe widths to the different values, for example, the waveguide thickness of one intermediate waveguide may be changed, or the refractive index change having the high polarization dependence may be caused.

The PD 20 illustrated in FIG. 1 will be described. The PD 20 is a waveguide type PD, and an n type InP clad layer, a InGaAsP guide layer, an InGaAsP core layer, an InGaAsP guide layer, an InP spacer layer, an undoped InGaAs absorption layer, a p type InP clad layer and a p type contact layer are sequentially formed on the n type InP semiconductor substrate. After performing the crystal growth of the layers from the n type clad layer to the absorption layer on the n type InP semiconductor substrate in a lump, for example, using a metalorganic vapor phase epitaxy (MOVPE) method or the like, the absorption layer located outside of an area corresponding to the optical waveguide is etched, and then by performing the re-growth of the p type clad layer, the waveguide type PD and the optical waveguide can be formed on the same semiconductor substrate. In addition, the PD 20 is optically connected to the light source. Herein, the PD 20 detects the light of the LD emitted from the opposite side of the optical modulator side as an amount of light output from the light source, whereby it is possible to perform the feedback control for an amount of injection electric current of the light source.

Finally, the optical waveguide illustrated in FIG. 1 will be described. The optical waveguide is configured so that an n type InP clad layer, an InGaAsP guide layer, an InGaAsP core layer, the InGaAsP guide layer, and a p type InP clad layer are formed on the n type InP semiconductor substrate. In order to achieve the complicated waveguide in a small device size, there is a need to reduce a bending radius of the waveguide. However, in this case, the generated loss increases. In order to reduce the bending radius while suppressing the loss, it is useful to increase an optical confinement coefficient. In order to set the optical confinement coefficient to a desired high value, the thickness of the optical confinement area which includes the guide layer and the core layer is set to about 0.3 μm, and the width of the waveguide is set to about 1.0 μm. Furthermore, as a waveguide structure having a high optical confinement coefficient, similarly to the MZ modulator illustrated in FIG. 4, the deep ridge structure is preferable. In addition, herein, as the waveguide structure having a high optical confinement coefficient, although polyimide serving as a low refractive index polymer is used in a material that buries both sides of the deep ridge structure, but the present invention is not limited thereto, for example, benzocyclobutene (BCB) may be used, or a semiconductor having a large band gap or semi-insulating properties may be adopted.

In addition, in a case where the structures of the active layers of the adjacent optical components are different from each other, for the connection growth of the adjacent optical components, a known butt joint (BJ) method may be used.

The optical semiconductor device related to the present embodiment is useful for applying to applications such as Ethernet (registered trademark) and interconnects. Through internet content increasing annually due to the spread of broadband services and increases in the internet population, for information communication services, further speed increases and increases in communication capacity are required. Although the speed increase per channel is useful for the capacity enlargement, processing and amplification of the electrical signal are becoming difficult both economically and in view of electric power consumption along with the speed up. For that reason, recently, an increase in electric power consumption and a rise in costs of a related apparatus and components accompanied by an increase in communication capacity have also become a great problem. In order to meet the requirements, in the current information communication services, methods such as a wavelength division multiplex (WDM) method, a multi-level phase modulation method, a polarization multiplexing method are adopted. The WDM method is a method that allocates wavelengths to channels respectively to increase the communication capacity by the number of wavelengths. Since the wavelength range is limited from the viewpoint of the fiber loss and the fiber dispersion, there is a need to narrow the wavelength interval in order to increase the number of channels. As a result, the wavelength control, the crosstalk between the wavelengths, and the optical loss accompanied by the multi/demultiplexing become a problem. In the WDM method, since there is a need to precisely lock the wavelength on the WDM grid having the narrowed interval, in the WDM method, a wavelength locker is generally used. The multi-level phase modulation method is a method of excellent dispersion tolerance and is usually used for the long distance transmission. Although the frequency usage efficiency is improved by increasing the number of the multiple value placed on the constellation map in which modulation ingredients are complex-displayed, it is impossible to increase the number of the multiple value without limitation due to the influence of a phase noise. Thus, a further improvement in frequency usage efficiency is promoted by combining the multi-level phase modulation method with the polarization multiplexing method. Among the modulation methods in which the multi-level phase modulation method is combined with the polarization multiplexing method, the DP-QPSK shown in the present embodiment is already practically used. In order to increase the transmission capacity, the methods are introduced in the sequence of the WDM method, the multi-level phase modulation method, and the polarization multiplexing method, to thereby promote an improvement in frequency usage efficiency.

The optical semiconductor device related to the embodiment realizes an optical device of a large-capacity without raising the baud rate. There is no need for an implementation optical component such as a polarization rotator that has been used in the related art, and an implementation process and an optical loss are reduced. In addition, it is possible to realize optical devices such as Ethernet (registered trademark) and interconnects that have relatively small size, low cost, and low electric power consumption for a short distance, by greatly reducing an optical connection in a bulk optical system.

In addition, in the optical semiconductor device related to the embodiment, the thin film resistors are included in the two light sources, and the two light sources are capable of adjusting the wavelength. From the viewpoint of improvement in the characteristics of the device and the stability of characteristics of the device, both the two light sources are preferably wavelength-tunable lasers which can adjust the wavelength. However, in the view of performing the control so that the wavelength of the light output from one light source approaches the wavelength of the light output from the other light source, that is, is within a predetermined range with respect to the wavelength of the light of the light output from the other light source, at least one light source may be able to adjust the wavelength, and the other light source does not necessarily need to be able to adjust the wavelength. That is, the other light source does not need to include the thin film resistor. This is also true for the optical semiconductor device related to embodiments described below.

Furthermore, the optical semiconductor device related to the present embodiment may be able to bring the wavelength of the light output from one light source near the wavelength of the light output from the other light source. The wavelengths of the beams of light output from the two light sources may relatively approach a predetermined range, and as in the wavelength control performed by the wavelength locker, there is no need to bring the wavelengths of the beams of light output from the two light sources near a predetermined absolute wavelength. Thus, compared to a case where the wavelengths of the beams of light output from the two light sources are brought near the absolute wavelength, it is possible to manufacture the optical semiconductor device related to the present embodiment with low wavelength precision, and the low cost and the low size can be realized.

When the optical semiconductor device related to the present embodiment is applied to the optical communication, at least one light source of the optical semiconductor device related to the present embodiment is preferably able to adjust the entire range of the wavelength in the wavelength range of a C band or a L band that are general wavelength bands in the optical communication, and it is more preferable that both the two light sources can adjust the wavelength over the entire range.

Second Embodiment

An optical semiconductor device related to a second embodiment of the present invention differs from the optical semiconductor device related to the first embodiment in that an optical component for detecting whether there is a difference in the wavelengths of the two light sources is further included, but the others are the same configurations as those of the first embodiment. By including such an optical component, there is further an effect that the wavelength of the two light sources can be more precisely controlled in addition to the effect described in the first embodiment.

Figure 5:
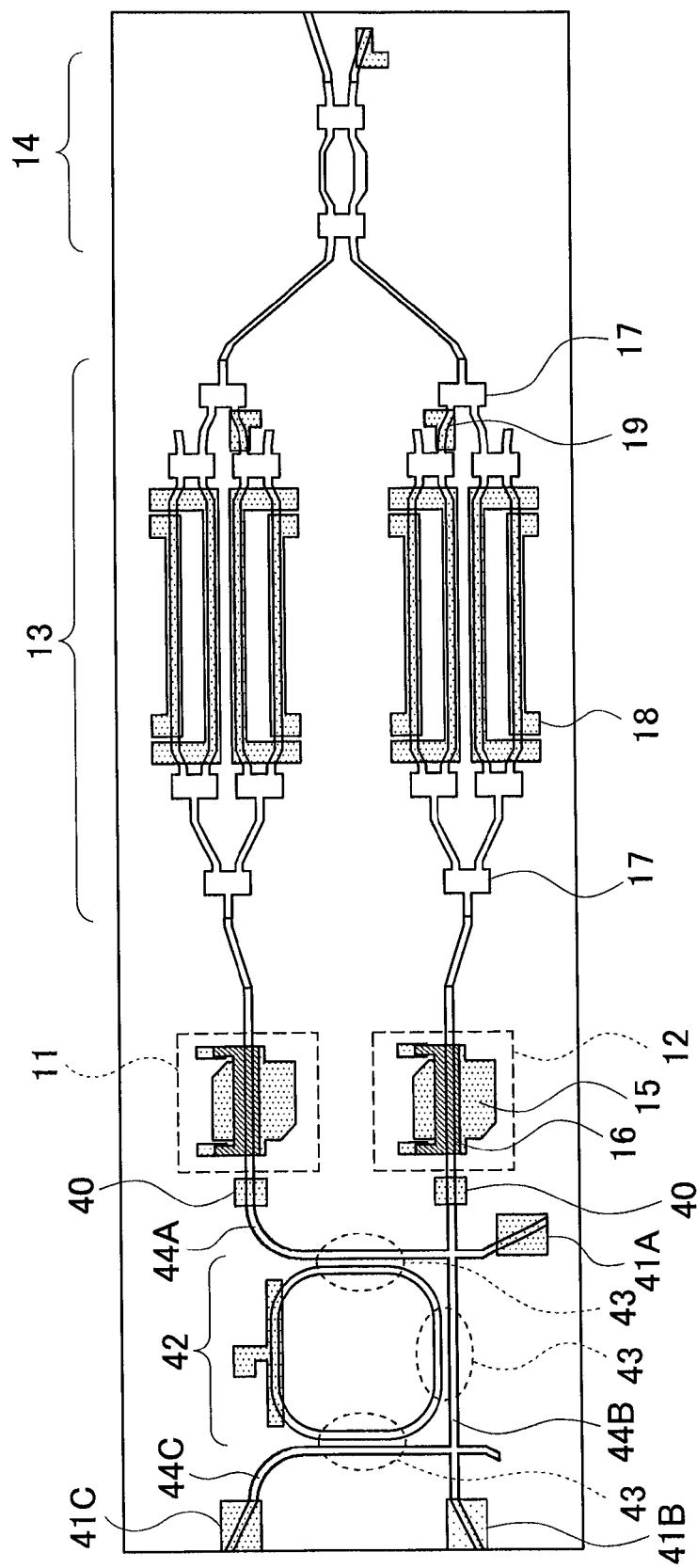
FIG. 5 is a schematic top view of an optical semiconductor device related to a second embodiment of the present invention.

FIG. 5 is a schematic top view of the optical semiconductor device related to the present embodiment. On a side of each of the two LDs opposite to the modulation area 13 side, similarly to the PD 20 of the first embodiment, a first PD 40 serving as a light output monitor of the LD is placed so as to be optically connected to the corresponding LD. In addition, an optical waveguide 44 is further extended through the first PD 40 from each LD, and a second PD 41 (optical receiver) serving as a resonance monitor is placed at a trailing end thereof, and the LD and the optical waveguide 44 are optically connected to each other. Herein, a first optical waveguide 44A is extended to the left of FIG. 5 from the first LD 11, is bent downward, and is extended further downward and a second PD 41A is placed at a trailing end thereof. Furthermore, a second optical waveguide 44B is extended to the left of FIG. 5 from the second LD 12, and a second PD 41B is placed at a trailing end thereof. By bending the optical waveguide 44 near the trailing end, an end surface reflection is suppressed. In addition, the second PD 41 is placed at the trailing end, whereby the light is absorbed by the second PD 41, and thus stray light is suppressed in which the light that is output from one light source is mixed with the other light source via a ring resonator 42.

At the left side of FIG. 5 of the first optical waveguide 44A extended from the first LD 11, and at the upside of FIG. 5 of the second optical waveguide 44B extended from the second LD 12, the ring resonator 42 is placed so as to be adjacent thereto. In addition, a third optical waveguide 44C extended vertically in FIG. 5 is placed so as to be adjacent to the left side of the ring resonator 42. The third optical waveguide 44C is extended upward in FIG. 5, is bent to the left, and is extended to the right. The second PD 41C is placed at a trailing end thereof, and similarly to the first optical waveguide 44A and the second optical waveguide 44B, the vicinity of the trailing end is bent.

Both the first PD 40 and the second PD 41 are waveguide type PDs, and have the same structure as the PD 20 related to the first embodiment. With such a structure, the first PD 40 serves as a light output monitor that detects intensity of the light to be output, and the second PD 41 serves as a resonance monitor that detects intensity of the light resonated by the resonator. Herein, the second PD 41 is a detector that detects the light transmitting the ring resonator. It is possible to remove the influence of the output fluctuation of the light source, by obtaining an amount of division in which an amount of monitor of the second PD 41 is divided by an amount of monitor of the first PD 40.

In addition, herein, although the optical semiconductor device related to the embodiment includes three optical waveguides 44, the present invention is not limited thereto, and the number of the optical waveguides 44 optically coupled to the ring resonator 42 may be increased or decreased if necessary. Furthermore, although the second PD 41 is placed at each trailing end of three optical waveguides 44, the second PD(s) 41 may be only placed on some of the optical waveguides 44, without being limited thereto. Any one of the three second PDs 41 may be used as a resonance monitor, and at the viewpoint of suppressing the detection of the light that is directly output from the LD, it is preferable that the second PD 41C placed at the trailing end of the third optical waveguide 44C be used as the resonance monitor. A shape of the trailing end of the side of the first optical waveguide 44A and the second optical waveguide 44B opposite to the light source, and the presence or absence of the second PD 41 can be changed if necessary.

The ring resonator 42 is configured so that an n type InP clad layer, an InGaAsP guide layer, an InGaAsP core layer, an InGaAsP guide layer, and a p type InP clad layer are formed on the n type InP semiconductor substrate. Similarly to the optical waveguide, in order to set the optical confinement coefficient to a desired high value, the thickness of the optical confinement area including the guide layer and the core layer is set to about 0.5 μm, and the width of the waveguide is set to about 1.0 μm. Furthermore, as the waveguide structure having the high optical confinement coefficient, as in the MZ modulator illustrated in FIG. 4, the deep ridge structure is preferable. A part of the ring resonator 42 is extended in parallel with an adjacent optical waveguide while maintaining a fixed interval. In such a location, the ring resonator 42 and the optical waveguide are optically connected to each other. The location serves as a directional coupler 43. As a result, the ring resonator 42 is optically connected to the light source (LD) and the second PD 41. The transmittance characteristics of the ring resonator 42 are periodical if the refractive index of the medium is constant in each waveguide. When it is assumed that X is a resonance frequency, $\lambda_{FSR}$ is a wavelength interval, R is a ring radius, and $n_{eff}$ is an effective refractive index of the core layer, since a rate of change period (FSR: Free Spectral Range) is $\lambda_{FSR} \cong \lambda^2/(2\pi \cdot R \cdot n_{eff})$ an arbitrary FSR can be selected for one period length, and finesse can be designed by coupling coefficient with the optical waveguide.

Furthermore, since the ring resonator 42 is an optical waveguide through which the different polarizations are concurrently guided, there is a need to set the effective refractive index to be as a closer value as possible between the different polarizations. This is in order to obtain the close FSR even in the different polarizations. When the up, down, left and right cladding materials are the same in the cross-section of the waveguide, the effective refractive indices between the polarizations can be approached each other, by approaching a square shape, and when the clad materials are different for up and down and left and right, the effective refractive indices can be approached each other by a rectangular shape that compensates for the refractive index difference. In the above-mentioned structure, the effective refractive index is 3.246481 in the TE polarization, and is 3.246371 in the TM polarization, and the refractive indices can be nearly the same. Between the TE polarization and the TM polarization, the difference of the effective refractive index is suppressed to 0.0034%, and if the polarization dependence is suppressed in this range, the wavelength precision required for the transmission distance 10 km in the baud rate 25 Gbaud can correspond to 20 pm. In this manner, by allowing the refractive characteristics of the waveguide to be common to both of the polarizations, it is possible to allow the operation of the ring resonator to be common to both polarizations. The polarization dependence of the resonator is preferably suppressed, and one effective refractive index is preferably within a range of ±0.01% with respect to the other effective refractive index. In addition, generally, it is known that the wavelength dependence and the temperature dependence occur in the FSR, when forming the resonator using semiconductor, however, in the application of the present invention, since only the transmission wavelength may be within a predetermined range in the application of the present invention, there is no problem.

In addition, as illustrated in FIG. 5, a shape of the optical waveguide which is provided in the ring resonator 42 and orbits in a ring shape is not a circular shape, but a shape of a rectangle with a rounded top. Since the ring resonator 42 is optically coupled with the three optical waveguides 44 as a directional coupler, such a shape is provided, but the present invention is not limited thereto. If a desired coupling coefficient can be obtained between the ring resonator 42 and the optical waveguide 44 by placing the ring resonator 42 and the optical waveguide 44 in a more adjacent manner, the shape of the optical waveguide of the ring resonator 42 may be more nearly a circular shape, and the reverse thereof is possible. Furthermore, as illustrated in FIG. 5, an electrode is included in a part of the waveguide through which the ring resonator 42 orbits, and by applying a predetermined voltage to the electrode, it is possible to change the effective refractive index of the active layer below the electrode. It is possible to control the wavelength dependence characteristics of the ring resonator 42, by controlling the voltage applied to the electrode.

In the present embodiment, even in the different polarizations, the operation of the common transmission wavelength characteristics is preferable. Thus, it is preferable that the FSR be set in consideration of the wavelength difference due to manufacturing. The wavelength difference due to manufacturing is shifted similarly in a plurality of light sources, the absolute wavelength is not problematic in the application of the present invention, and the FSR is set to 1 nm.

Since the wavelength precision is set by the slope of the generated FSR, when the FSR is great, there is a need to sharpen finesse. Since there is a need for a careful control of the wavelength in the relatively great FSR, finesse is preferably great. In order to increase the Q value, the coupling coefficient is preferably low, but if the coupling coefficient is too low, the transmission strength decreases, it affects the wavelength control resolving power together with the resolving sensitivity of the PD, and thus there is a need for the suitable setting of the coupling coefficient. Herein, in order to obtain the high finesse, the ring resonator and the optical waveguide are placed so that the coupling part between the ring resonator and the optical waveguide becomes a directional coupler. The optical waveguide and the ring resonator adopt a deep ridge structure, the insertion loss of the directional coupler is suppressed by the great optical confinement coefficient, and high finesse can be obtained. When the coupling part is a directional coupler, since the vibration direction of the electric filed differs in the TE polarization and the TM polarization, the effusion of the electric field differs, and there is a need to set a length in which the coupling length is matched. It is desirable to adjust the optical waveguide in the coupling part and the mesa width of the ring resonator 42.

Next, a method of approaching a resonance wavelength of the different polarizations will be described. If the difference in the resonance wavelength between the polarizations is set to within 4 pm that is the wavelength precision required for the transmission distance of 40 km, for example, in the baud rate 25 Gbaud, there is a need to set the difference of the effective refractive index between the polarizations to within $10^{-5}$. It is difficult to perform the control and the manufacturing within the range when considering the deviation or the like of the mesa stripe width due to manufacturing. For this reason, the resonance wavelength of the ring resonator may be controlled using the refractive index change having great polarization dependence. For example, it is preferable to perform the control so that the same resonance frequency is obtained in the different polarizations, by changing only the resonance wavelength of one polarization using an electro-optic effect such as the Pockels effect and the acousto-optic effect such as a photoelastic effect. That is, the polarization dependence of the optical component for detecting whether or not there is a difference in the wavelength of two light sources is suppressed using the polarization dependence of the refractive index change.

In addition, although the FSR is set to be large in consideration of the wavelength difference due to manufacturing in the present embodiment, the FSR may be set to be small, and finesse may be smooth. The optical semiconductor device related to the present embodiment does not necessarily need to match the wavelengths of the beams of light output from the two light sources having the different polarizations to a predetermined absolute wave length. The optical semiconductor device related to the present embodiment is characterized in that it is possible to relatively match the wavelengths of the beams of light output from the two light sources to each other by the simple and easy configuration including the resistor. Thereby, it is possible to realize optical devices such as Ethernet (registered trademark) having high transmission performance and interconnects that have relatively small size, low cost, and low electric power consumption for a relatively short distance.

In addition, in the optical semiconductor device related to the present embodiment, although the ring resonator is used as an optical component for detecting whether or not there is a difference in the wavelengths of the two light sources, the present invention is not limited thereto, and a device (element) for detecting whether or not there is a difference in the wavelengths of the beams of light each output from the two light sources having the wavelength dependence may be adopted. In addition, the device (element) may be optically connected to each of the two light sources, and the beams of light that are output from the two light sources do not need to be directly input to the device (element). That is, the beams of light that are output from the two light sources may be input to the device (element) via optical components such as an optical receiver, an optical waveguide, and a coupler. In addition, the device (element) having the wavelength dependence is an device (element) that has strong wavelength dependence in the transmittance or the reflectance of the light of the device, and can generate a special difference of intensity of the light of the predetermined wavelength range after the light transmits through or reflects at the device compared to intensity of the light in the other range. The light after the light transmits through or reflects at the device has the wavelength dependence, and the light is light which the device converts the beams of light each output from the two light sources. The second PD 41 (optical detector) detects the light. It is possible to control the characteristics of the device and the light sources with the signal detected by the second PD 41. Furthermore, as in the PD 20 in the first embodiment, a part or all of the first PD 40, the second PD 41C, the optical waveguide 44, and the ring resonator 42 does not necessarily need to be integrated on the same substrate as the two light sources and the two modulators, but may be placed as separate devices. In addition, as in the first embodiment, a plurality of sets of three or more of the sets of the light sources and the modulators may be integrated on the same substrate.

Third Embodiment

An optical semiconductor device related to a third embodiment of the present invention is different from the optical semiconductor device related to the second embodiment in that the location in which the ring resonator 42 and the optical waveguide are optically coupled to each other uses not the directional coupler but an MMI multiplexer/demultiplexer. However, the other structures are the same as those of the optical semiconductor device related to the second embodiment.

Figure 6:
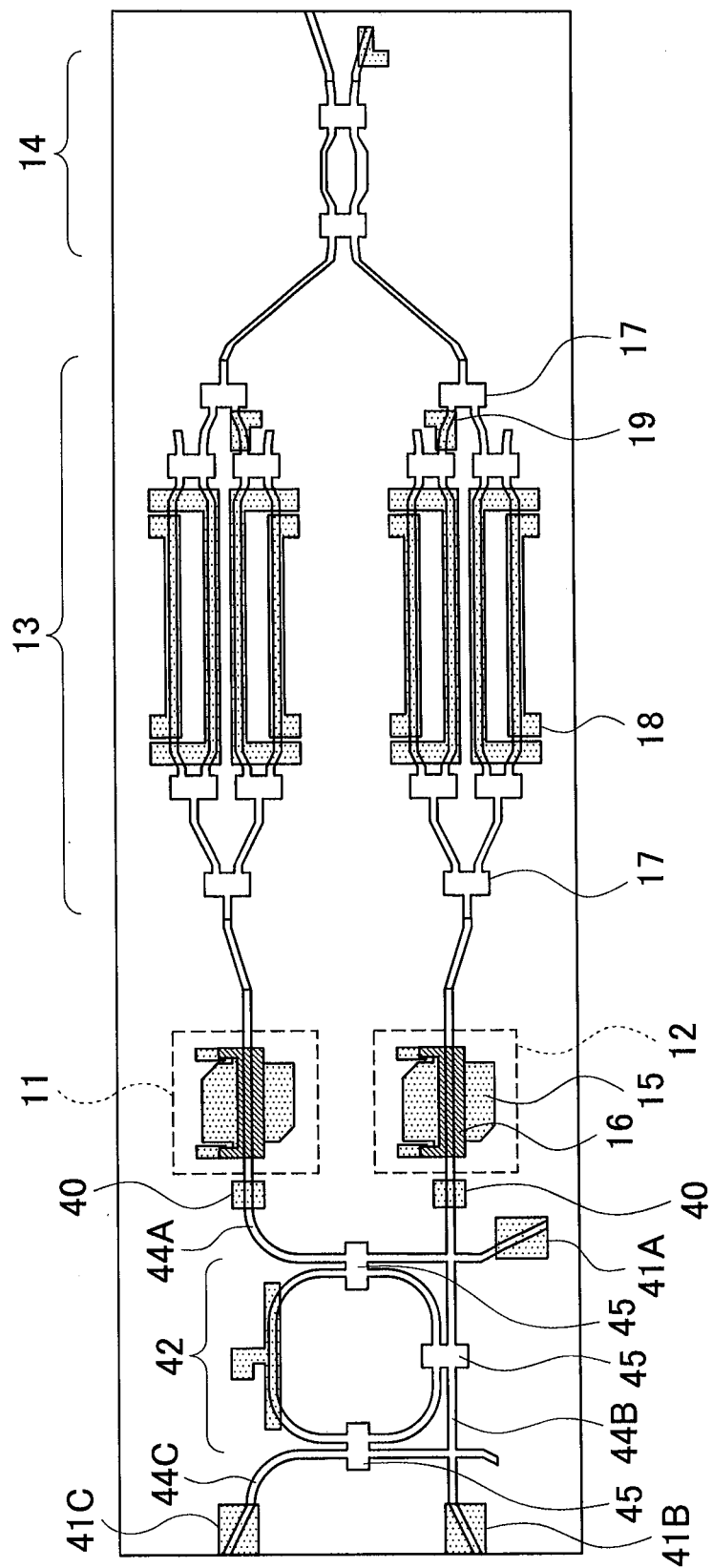
FIG. 6 is a schematic top view of an optical semiconductor device related to a third embodiment of the present invention.

FIG. 6 is a schematic top view of the optical semiconductor device related to the present embodiment. As mentioned above, the MMI multiplexer/demultiplexer 45 is placed in the coupling location of the ring resonator 42 and the optical waveguide. The MMI multiplexer/demultiplexer 45 related to the present embodiment has a rectangular shape that is extended in an optical axial direction at a predetermined width by a predetermined length. In addition, the MMI multiplexers/demultiplexers 45 in which the optical waveguides 44A, 44B and 44C illustrated in FIG. 6 are placed in the coupling location with the ring resonator 42 are a first MMI multiplexer/demultiplexer, a second MMI multiplexer/demultiplexer, and a third MMI multiplexer/demultiplexer, respectively.

In the optical semiconductor device related to the second embodiment, the coupling part between the ring resonator and the optical waveguide is a directional coupler, and the two mesa stripes are arranged in a line. In order to make such a structure, high precision processing is required, for example, the two mesa stripes are placed in a narrow mesa interval or the mesa side wall is made to a desired condition since the roughness of the mess side wall affects the coupling coefficient. On the contrary, in the optical semiconductor device related to the present embodiment, by making the coupling part between the ring resonator and the optical waveguide to the MMI coupler, compared to the second embodiment, it is possible to realize the optical semiconductor device that precisely controls the wavelengths of two light sources by simpler processing.

Fourth Embodiment

An optical semiconductor device related to a fourth embodiment of the present invention is different from the optical semiconductor device related to the third embodiment in the shape of the MMI multiplexer/demultiplexer, but the others have the same configurations as those of the optical semiconductor device related to the third embodiment.

Figure 7:
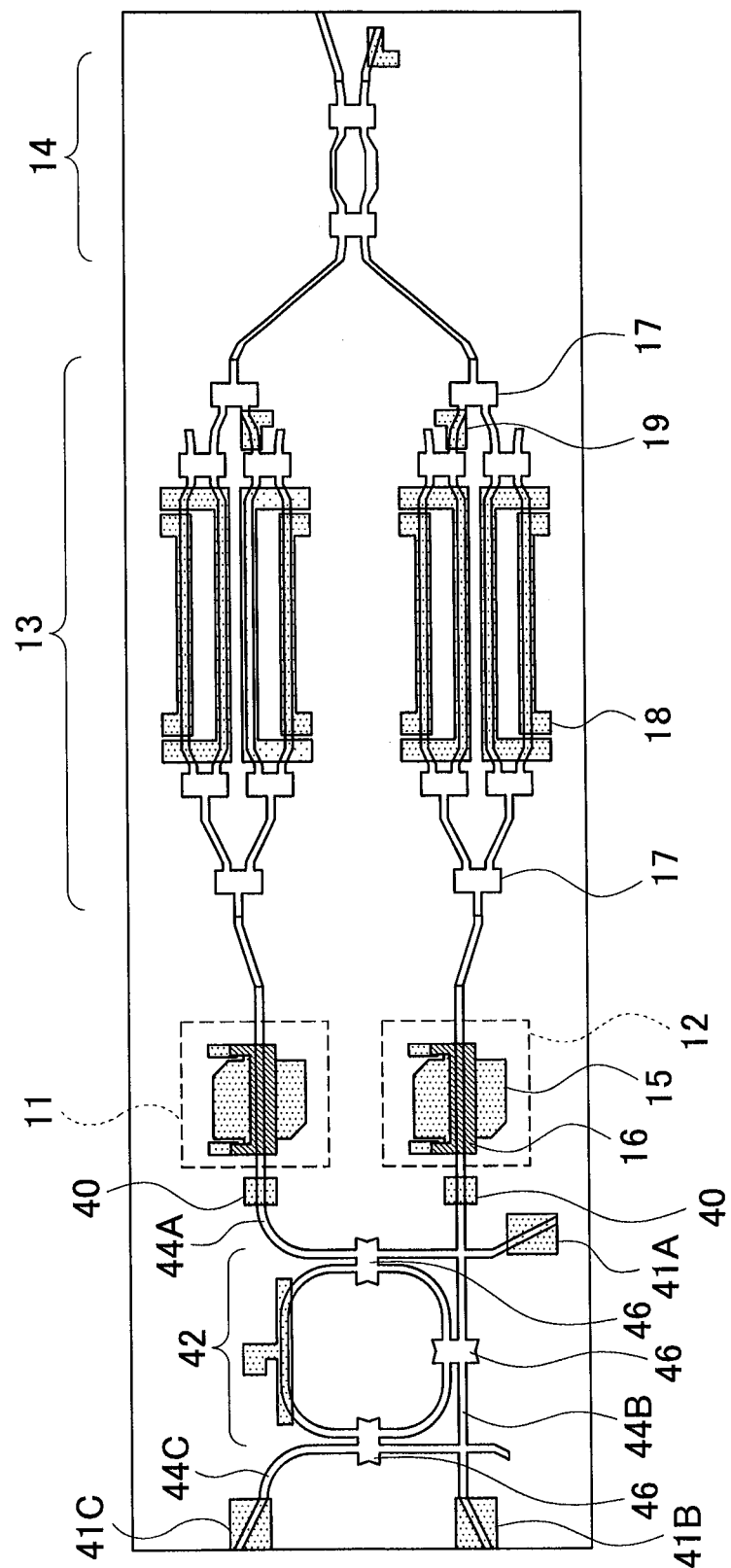
FIG. 7 is a schematic top view of an optical semiconductor device related to a fourth embodiment of the present invention.
Figure 8A:
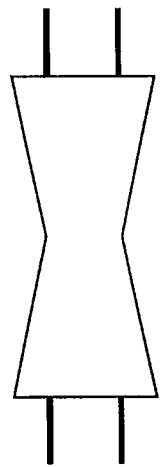
FIG. 8A is a schematic view that illustrates a structure of a MMI multiplexer/demultiplexer related to the fourth embodiment of the present invention.

FIG. 7 is a schematic top view of the optical semiconductor device related to the present embodiment. A MMI multiplexer/demultiplexer 46 is placed in a coupling location between the ring resonator 42 and the optical waveguide. FIG. 8A is a schematic view that illustrates a structure of the MMI multiplexer/demultiplexer 46 related to the present embodiment. As illustrated in FIGS. 7 and 8A, there is a shape in which the mesa width of the MMI multiplexer/demultiplexer 46 becomes gradually smaller from one end (a taper shape), and becomes greater again and reaches the other end (a reverse taper shape) along the optical axial direction. That is, the MMI multiplexer/demultiplexer 46 related to the present embodiment is provided with a neck (notch) in the optical axial direction. With such a shape, the effective refractive indices of three MMI multiplexers/demultiplexers 46 illustrated in FIG. 7 are changed along the optical axial direction. That is, the contrast of the MMI multiplexers/demultiplexers 46 is changed along the optical axial direction. Thereby, it is possible to suitably control the coupling coefficient between the ring resonator and the optical waveguide and adjust sharpness (Q value) of the resonance of the ring resonator. The control of sharpness of the resonance enables to suitably set the wavelength precision.

Figure 8B:
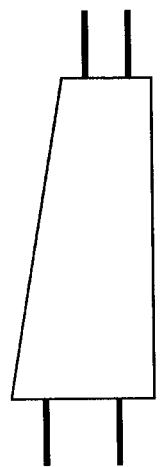
FIG. 8B is a schematic view that illustrates another example of the structure of the MMI multiplexer/demultiplexer related to the fourth embodiment of the present invention.
Figure 8C:
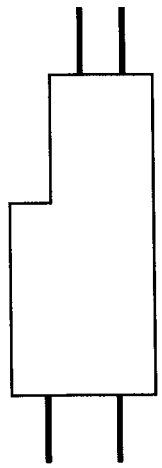
FIG. 8C is a schematic view that illustrates still another example of the structure of the MMI multiplexer/demultiplexer related to the fourth embodiment of the present invention.

The shape of the MMI multiplexer/demultiplexer 46 is not limited to the shape illustrated in FIG. 8A, and is widely applied if it is a shape in which the effective refractive index is changed along the optical axial direction and suitably controls the coupling coefficient between the ring resonator and the optical waveguide. FIGS. 8B and 8C are schematic views that illustrate another example of the structure of the MMI multiplexer/demultiplexer 46 related to the present embodiment. As illustrated in FIG. 8B, the shape of the MMI multiplexer/demultiplexer 46 may be a shape in which the mesa width of the MMI multiplexer/demultiplexer 46 becomes gradually smaller along the optical axial direction from one end to the other end. Furthermore, as illustrated in FIG. 8C, the shape of the MMI multiplexer/demultiplexer 46 may be a shape in which the mesa width of one end side and the mesa width of the other end side are extended differently. In addition, the MMI multiplexer/demultiplexer may be one in which the effective refractive index is changed along the optical axial direction, and does not need to be limited to one realized by the shape. For example, stress may be applied to the MMI multiplexer/demultiplexer so that the stress distribution occurs along the optical axial direction, and the MMI multiplexer/demultiplexer may be manufactured so that the material composition is changed along the optical axial direction.

The optical semiconductor device related to the present embodiment includes the MMI multiplexer/demultiplexer having the shape in which the effective refractive index is changed along the optical axial direction, whereby the optical semiconductor device having improved characteristics is realized compared to the third embodiment.

Fifth Embodiment

An optical semiconductor device related to a fifth embodiment of the present invention is different from the optical semiconductor devices related to the second to fourth embodiments in a configuration of an optical component for detecting whether or not there is a difference between the wavelengths of the two light sources. The others have the same configurations as those of the optical semiconductor devices related to the second to fourth embodiments.

Figure 9:
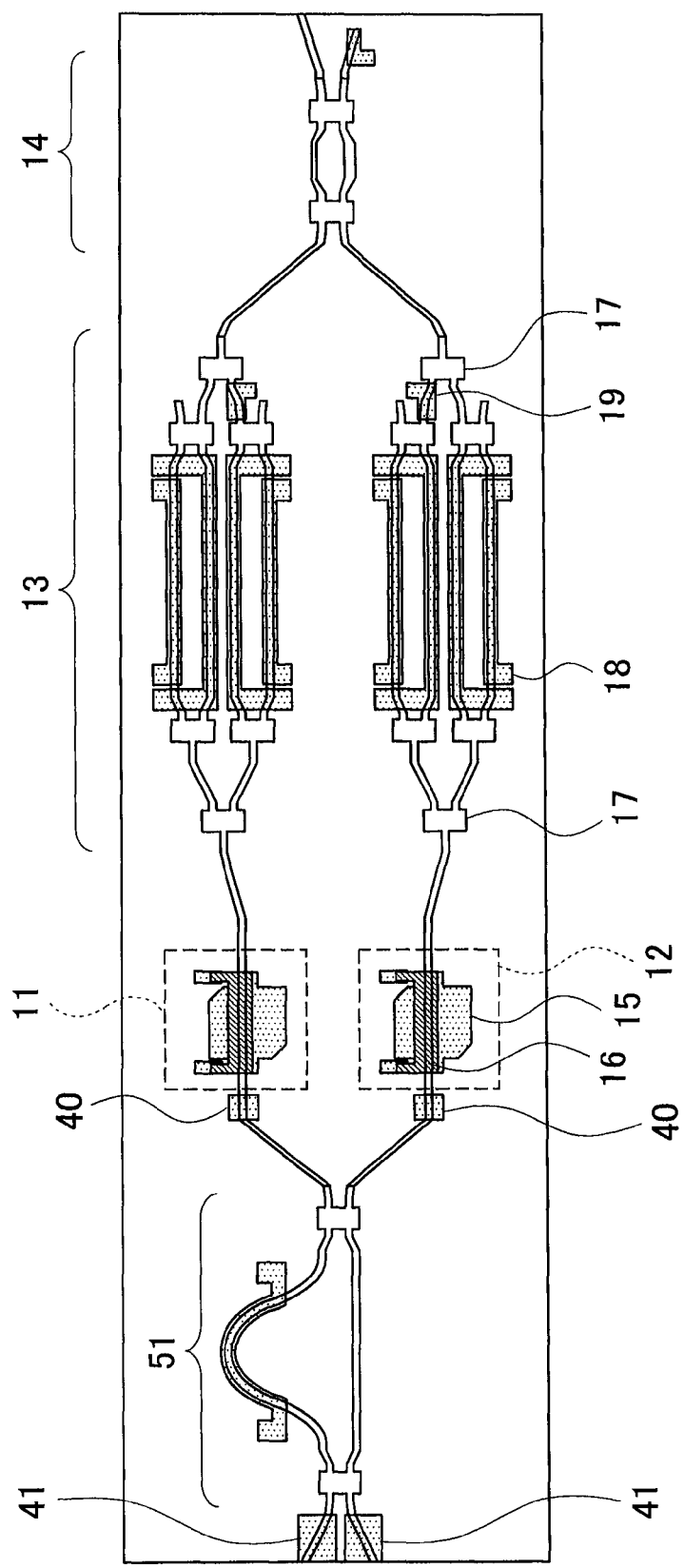
FIG. 9 is a schematic top view of an optical semiconductor device related to a fifth embodiment of the present invention.

FIG. 9 is a schematic top view of the optical semiconductor device related to the present embodiment. In the optical semiconductor device related to the present embodiment, a MZ type delay interferometer 51 is used for an optical component for detecting whether or not there is a difference between the wavelengths between the two light sources. As illustrated in FIG. 9, the first PD 40 serving as a light output monitor of the LD is placed at a side of each of two LDs opposite to the modulation area 13 side. In addition, the optical waveguide penetrates through the first PD 40 from each of two LDs, is further extended, and is optically connected to the MZ type delay interferometer 51. At the trailing ends of two optical waveguides each optically connected to the side of the MZ type delay interferometer 51 opposite to the LDs, second PDs 41 serving as the resonance monitors are each placed.

The MZ type delay interferometer 51 includes the two intermediate waveguides and MMI multiplexers/demultiplexers placed in front of and behind the same, as in the polarization multiplexer 14. The MZ type delay interferometer 51 has the same structure as the optical waveguide, and is optically connected to the two light sources and the two second PDs 41. An FSR of the MZ type delay interferometer 51 is defined by an optical path length difference but not the entire length of the arm (the intermediate waveguide). As the optical path length difference is small, the great FSR is generated, and as the optical path length difference is great, the small FSR is generated. When the optical path length difference between the two arms is set to L, the FSR is given by $\lambda_{FSR} \approx \lambda^2/(2 \cdot n_{\it eff} \cdot L)$.

In the optical semiconductor device related to the present embodiment, more remarkable effects are exhibited using the MZ type delay interferometer, that is, the FSR can be easily increased compared to a case of using the ring resonator, it is hard to increase finesse, and the coupling efficiency is high. In addition, compared to the second embodiment or the like, it is possible to realize the optical semiconductor device that precisely controls the wavelengths of the two light sources by the simpler processing. As illustrated in FIG. 9, as in the ring resonator 42 related to the second to fourth embodiments, the electrode is included in a predetermined area of one intermediate waveguide of the MZ type delay interferometer 51, and by applying a predetermined voltage to the electrode, it is possible to change the effective refractive index of the active layer under the electrode. By controlling the voltage applied to the electrode, it is possible to control the wavelength dependence characteristics of the MZ type delay interferometer 51.

In addition, in the optical semiconductor device related to the present embodiment, although the MZ type delay interferometer is used as an optical component for detecting whether or not there is a difference in the wavelengths of the two light sources, the device (element) having the wavelength dependence may be used, without being limited thereto. Furthermore, as in the ring resonator 42 or the like in the second to fourth embodiments, a part or all of the first PD 40, the second PD 41, and the MZ type delay interferometer 51 do not necessarily need to be integrated on the same substrate as the two light sources and the two modulators, but may be placed as separate devices. In addition, as in the first to fourth embodiments, a plurality of sets of the light sources and the modulators of three sets of more may be integrated on the same substrate.

Sixth Embodiment

An optical semiconductor device related to a sixth embodiment of the present invention has the same structure as that of the optical semiconductor device related to the first to fifth embodiments except for using a wavelength-tunable LD of the distributed Bragg reflector type (DBR) as the light source. It is possible to adjust the wavelengths of each light source in a wider range using the DBR-LD as the light source, compared to the first to fifth embodiments.

Figure 10:
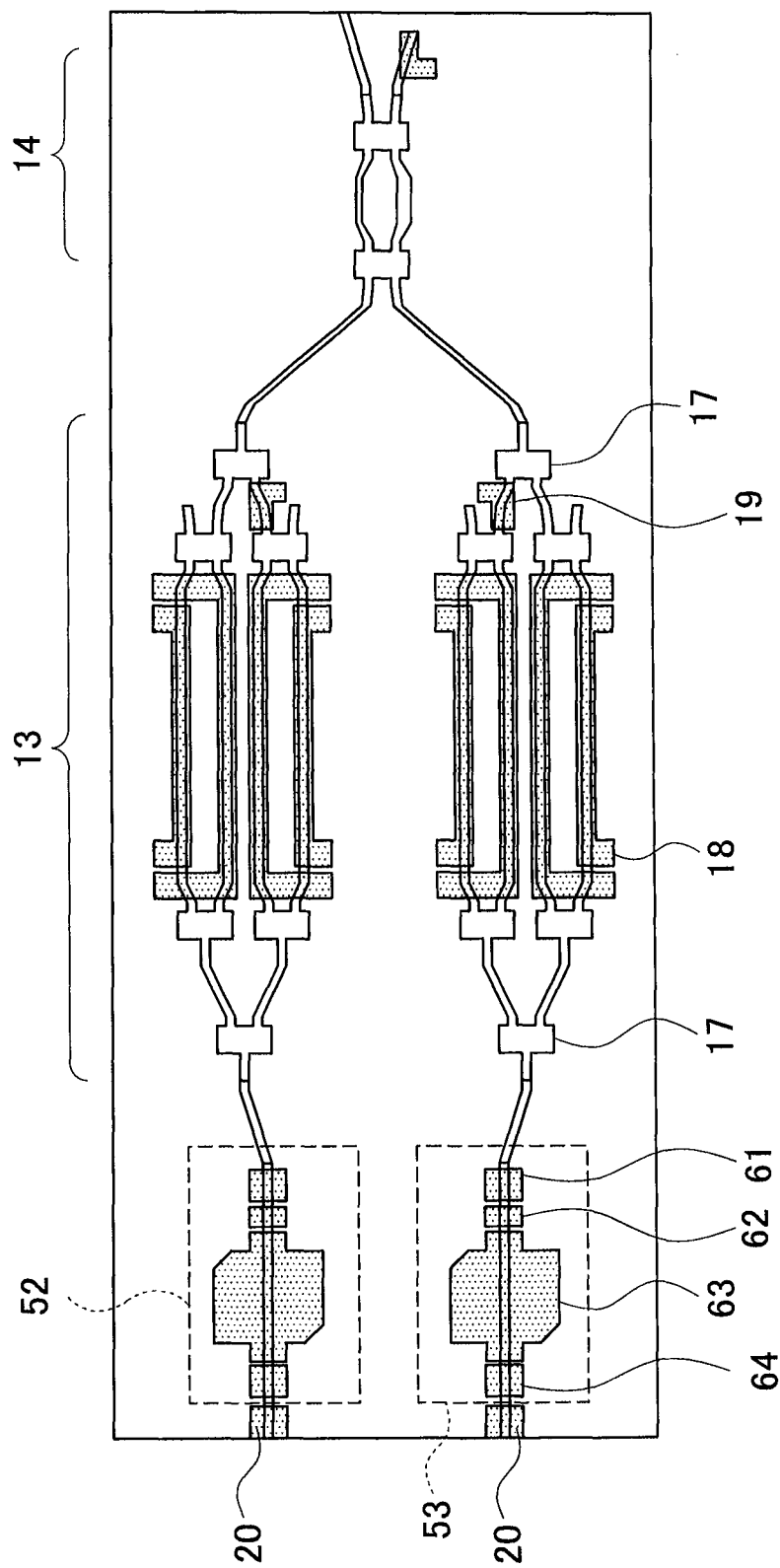
FIG. 10 is a schematic top view of an optical semiconductor device related to a sixth embodiment of the present invention.

FIG. 10 is a schematic top view of the optical semiconductor device related to the present embodiment. As illustrated in FIG. 10, the two light sources included in the optical semiconductor device are a first LD 52 configured to output the light having the TE polarization and a second LD 53 configured to output the light having the TM polarization, and both of them are DBR-LDs. The configurations other than the two light sources are the same as those of the optical semiconductor device related to the first embodiment illustrated in FIG. 1. Each LD has a front DBR mirror 61, a phase adjustment unit 62, a gain unit 63, and a rear DBR mirror 64 sequentially from the emitting side of the light. The front DBR mirror 61 and the rear DBR mirror 64 each placed in front of and behind the gain unit 63 have diffraction grating in a multilayer, and are mirrors in which the refractive index change is caused by the electric current injection, and the reflection wavelength is changed. The phase adjustment unit 62 adjusts a phase in a resonator. The gain unit 63 is configured so that an n type InP clad layer, a guide layer, an active layer, a guide layer, a p type InP clad layer, and a p type contact layer are sequentially formed on the n-type InP semiconductor substrate. In addition, the active layer includes an InGaAsP multiple quantum well (MQW) layer. Furthermore, in the front DBR mirror 61 and the rear DBR mirror 64 (DBR mirror area), an n type InP clad layer, a guide layer, a core layer, a guide layer, a p type InP spacer layer, a diffraction grating layer, a p type InP clad layer, and a p type contact layer are sequentially formed on the n type InP semiconductor substrate. In addition, in the phase adjustment unit 62 (the phase adjustment area), an n type InP clad layer, a guide layer, a core layer, a guide layer, a p type InP clad layer, and a p type contact layer are sequentially formed on the n-type InP semiconductor substrate.

Since the optical semiconductor device related to the present embodiment uses the refractive index change due to the electric current injection to the DBR mirror and the phase adjustment unit, the conversion of the wavelength is quicker than the DFB-LD used in the optical semiconductor device related to the first to fifth embodiments. In addition, it is possible to realize the wavelength-tunable width in a broader band area broadband because of the wavelength selection due to the Vernier effect.

In addition, since the light source of the optical semiconductor device related to the second to fifth embodiments can be replaced with the first LD 52 and the second LD 53, the wavelength adjustment of the two LDs can be more precisely controlled. Furthermore, there is an effect that, by matching the FSR of the ring resonator with the WDM grid wavelength, the function as the general wavelength locker can also be included. That is, in the optical semiconductor device related to the present embodiment, the optical device is realized which has high affinity with the WDM method as the wavelength precision is high, and has a small size, low cost and low electric power consumption for a relatively short distance. However, the WDM grid when using the semiconductor preferably has a relatively narrower band (wavelength range), for example, like LAN-WDM.

In addition, as in the first embodiment, the PD 20 or the like does not necessarily need to be integrated on the same substrate as the two light sources and the two modulators, but may be placed as separate devices. In addition, as in the first embodiment, a plurality of sets of the beams of light sources and the modulators of three sets or more may be integrated on the same substrate.

Seventh Embodiment

An optical semiconductor device related to a seventh embodiment of the present invention has the same structure as that of the optical semiconductor device related to the first to fifth embodiments except for using a wavelength-tunable LD that uses an LGLC as the light source. By using the LGLC-LD as the light source, it is possible to adjust the wavelength of each light source in the wider range, compared to the first to sixth embodiments.

Figure 11:
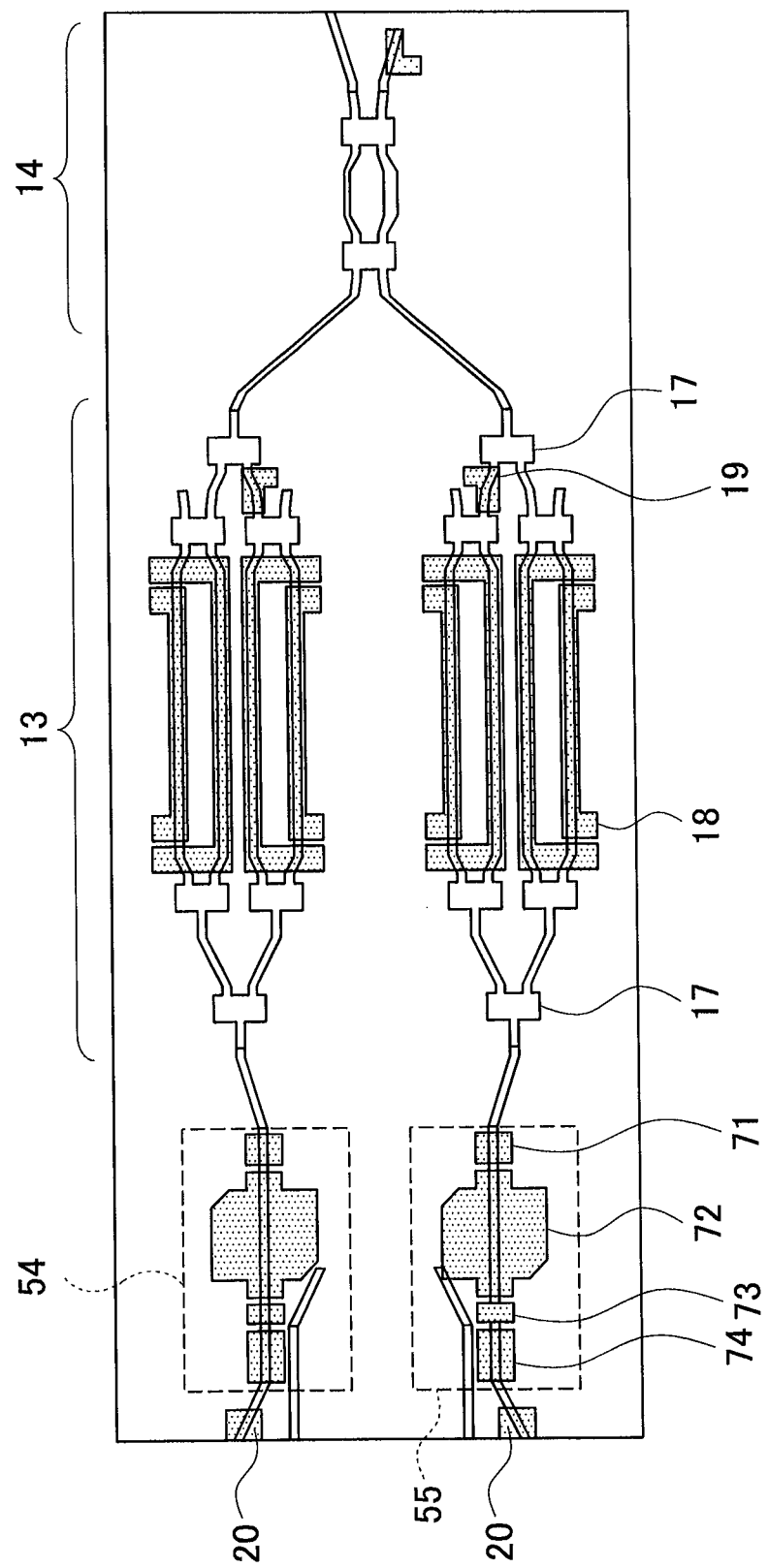
FIG. 11 is a schematic top view of an optical semiconductor device related to a seventh embodiment of the present invention.

FIG. 11 is a schematic top view of the optical semiconductor device related to the present embodiment. As illustrated in FIG. 11, the two light sources included in the optical semiconductor device are a first LD 54 configured to output the light having the TE polarization, and a second LD 55 configured to output the light having the TM polarization, and both of them are LGLC-LDs. The configurations other than the two light sources are the same as those of the optical semiconductor device related to the first embodiment illustrated in FIG. 1. Each LD has a DBR mirror 71, a gain unit 72, a phase adjustment unit 73, and a LGLC filter 74 sequentially from the emitting side of the light. The DBR mirror 71 placed in front of the gain unit 72 has a diffraction grating in a multilayer, and is a mirror in which the refractive index change is caused by the electric current injection, and the reflection wavelength is changed. The LGLC filter 74 placed behind the gain unit 72 is similarly a filter in which the refractive index change is caused, and the transmission wavelength is changed. The phase adjustment unit 73 adjusts the phase in the resonator. The gain unit 72 is configured so that an n type InP clad layer, a guide layer, am active layer, a guide layer, a p type InP clad layer, and a p type contact layer are sequentially formed on the n-type InP semiconductor substrate. In addition, the active layer includes an InGaAsP multiple quantum well (MQW) layer. Furthermore, in the DBR mirror 71, an n type InP clad layer, a guide layer, a core layer, a guide layer, a p type InP spacer layer, a diffraction grating layer, a p type InP clad layer, and a p type contact layer are sequentially formed on the n type InP semiconductor substrate. The LGLC filter 74 further includes a waveguide provided with a diffraction grating for optical transition assistance besides the waveguide, the two waveguides are optically coupled with each other, and function as the directional coupler. In the LGLC filter 74, an n type InP clad layer, a guide layer, a core layer, a guide layer, a p type InP spacer layer, a diffraction grating layer, a p type InP clad layer, and a p type contact layer are sequentially formed on the n-type InP semiconductor substrate. The phase adjustment unit 73 is configured so that an n type InP clad layer, a guide layer, a core layer, a guide layer, a p type InP clad layer, and a p type contact layer are sequentially formed on the n-type InP semiconductor substrate.

The first LD 54 and the second LD 55 are able to change the oscillating wavelength using the electric current injection to the LGLC filter, DBR mirror and the phase adjustment unit or the refractive index change due to the electric field application. Thereby, in the optical semiconductor device related to the present embodiment, it is possible to further raise controllability of the wavelength using the LGLC-LD as the light source, compared to the BDR-LD used for the optical semiconductor device related to the sixth embodiment. Furthermore, it is possible to realize the wavelength-tunable width wider than the DBR-LD.

In addition, since the light source of the optical semiconductor device related to the second to fifth embodiments can be replaced with the first LD 54 and the second LD 55, the wavelength adjustment of the two LDs can be further precisely controlled. Furthermore, there is an effect that, by matching the FSR of the ring resonator with the WDM grid wavelength, the function as the general wavelength locker can also be included. That is, in the optical semiconductor device related to the present embodiment, the optical device is realized which has high affinity with the WDM method as the wavelength precision is high, and has a small size, low cost and low electric power consumption for a relatively short distance. However, the WDM grid when using the semiconductor preferably has a relatively narrower band (wavelength range), for example, like LAN-WDM.

In addition, as in the first embodiment, the PD 20 or the like does not necessarily need to be integrated on the same substrate as the two light sources and the two modulators, but may be placed as separate devices. In addition, as in the first embodiment, a plurality of sets of the beams of light sources and the modulators of three sets or more may be integrated on the same substrate.

Eighth Embodiment

An optical semiconductor device related to an eighth embodiment of the present invention is an array optical semiconductor device in which a plurality of optical semiconductor devices related to the first to seventh embodiments are integrated on the same semiconductor substrate.

Figure 12:
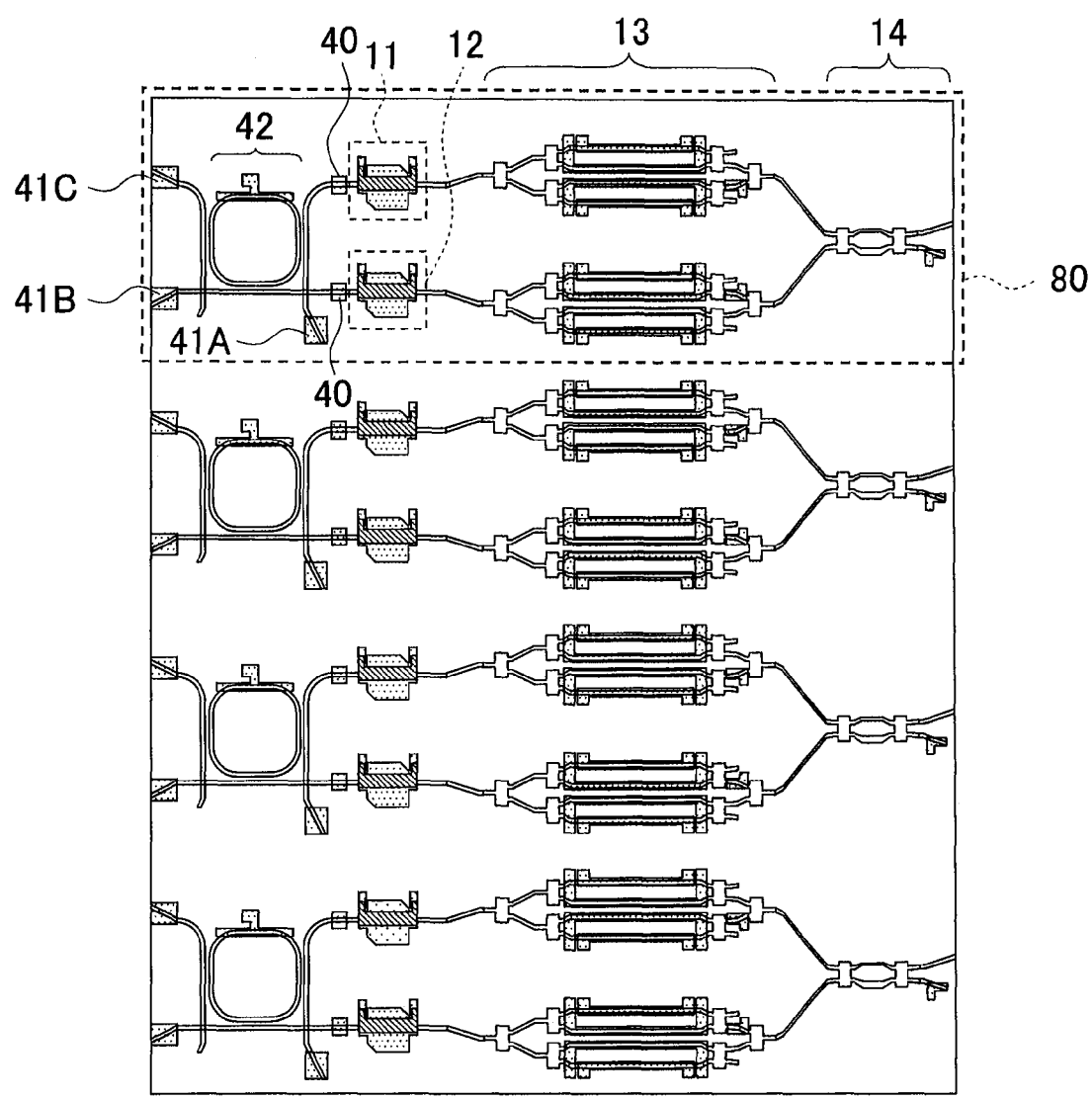
FIG. 12 is a schematic top view of an optical semiconductor device related to an eighth embodiment of the present invention.

FIG. 12 is a schematic top view of the optical semiconductor device related to the present embodiment. The optical semiconductor device illustrated in FIG. 12 is an array optical semiconductor device in which a plurality of optical semiconductor devices 80 related to the second embodiment illustrated in FIG. 5 are integrated on the same semiconductor substrate. Although FIG. 12 illustrates the array optical semiconductor device in which a plurality of optical semiconductor devices 80 related to the second embodiment illustrated in FIG. 5 are integrated, the present invention is not limited thereto, but an array optical semiconductor device may be adopted in which a plurality of optical semiconductor devices related to any one of the first to seventh embodiments are integrated. Furthermore, although FIG. 12 illustrates an array optical semiconductor device in which four optical semiconductor devices 80 are integrated on the same substrate, the number is not limited to four and it is needless to say that another number may be adopted.

In each of four optical semiconductor devices 80, the light source wavelength and the resonance wavelength of the resonator are manufactured so as to be shifted by the same wavelength pitch for each optical semiconductor device 80. Thereby, the array optical semiconductor device each of which is a DP-QPSK type, on which four devices are integrated and which adopts the wavelength division multiplex (WDM) type can be realized. For example, if the device is baud rate 25 Gbaud, it is possible to provide an optical semiconductor device of high capacity reaching 400 Gbps in one chip. It is possible to realize optical devices such as Ethernet (registered trademark) and interconnect that have relatively small size, low cost, low electric power consumption, and high capacity for a relatively short distance.

In addition, in FIG. 12, although an emission port is provided for each optical semiconductor device 80, the present invention is not limited thereto, but for example, the polarization multiplexer is further included on the array optical semiconductor device, and by multiplexing the light signals that are emitted from the plurality of optical semiconductor devices 80, it is possible to manufacture the device so that the number of the emitting ports is reduced compared to the number of the optical semiconductor devices 80. Particularly, by providing one emitting port, it is possible to more simply perform the optical connection with an optical fiber serving as a transmission line.

Ninth Embodiment

An optical module related to a ninth embodiment of the present invention includes the optical semiconductor device related to the first to eighth embodiments.

Figure 13:
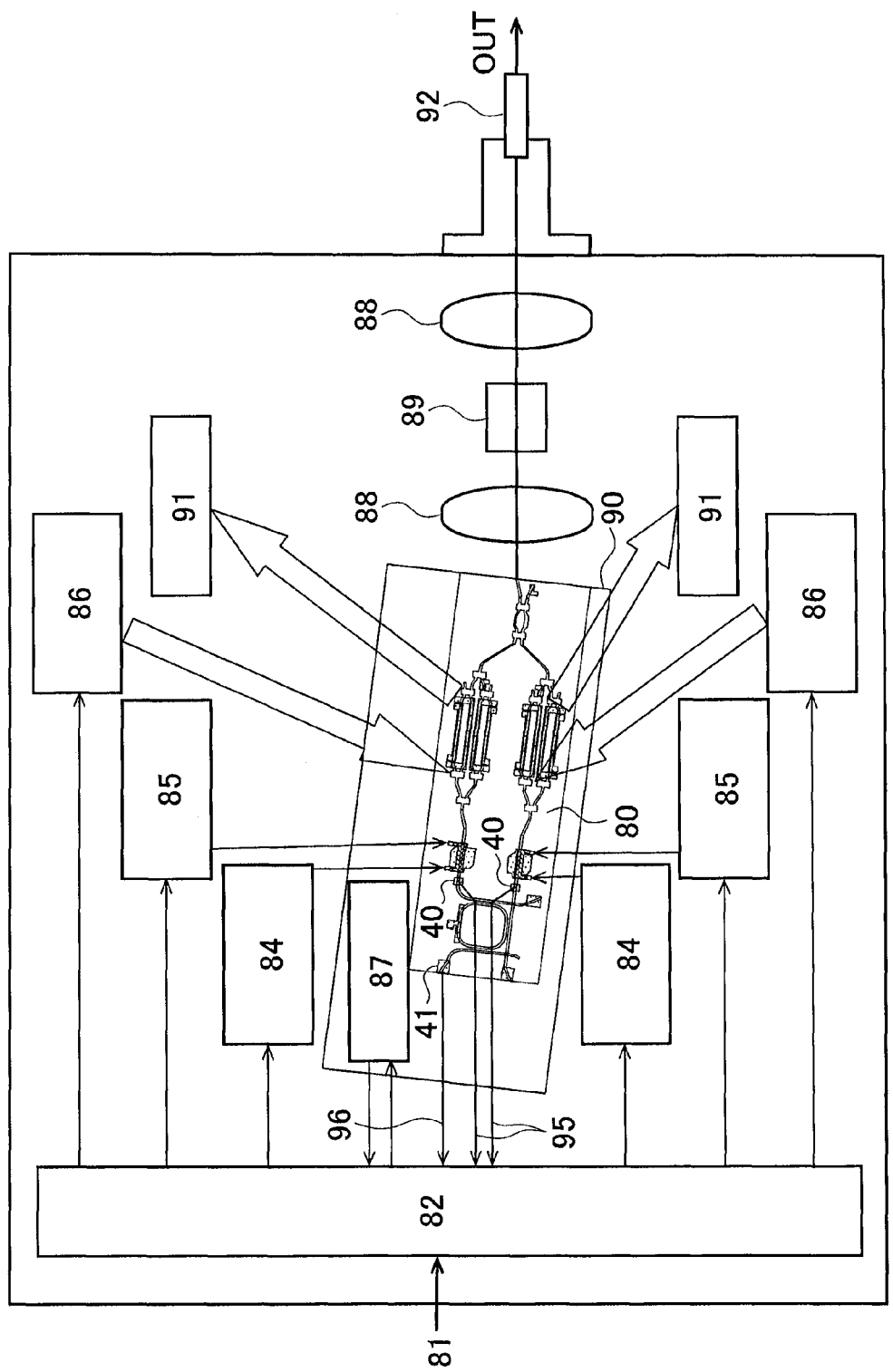
FIG. 13 is a schematic top view of an optical module related to a ninth embodiment of the present invention.

FIG. 13 is a schematic top view of the optical module related to the present embodiment. Although FIG. 13 illustrates the optical module that includes the optical semiconductor device 80 related to the second embodiment illustrated in FIG. 5, the present invention is not limited thereto, but an optical module including the optical semiconductor device related to any one of the first to eighth embodiments may be adopted.

A control signal 81 is input to the optical module related to the present embodiment from the outside. The optical semiconductor device 80 illustrated in FIG. 5 is provided on a carrier 90. The optical module includes a control circuit 82, wavelength control drivers 84, LD drivers 85, modulation drivers 86, a TEC 87 (temperature adjustment device), the carrier 90 provided with the optical semiconductor device 80, terminal resistors 91, two collimator lenses 88, an isolator 89, and an optical fiber 92. Herein, the control unit configured to control the optical semiconductor device 80 includes the control circuit 82, the wavelength control drivers 84, the LD drivers 85, the modulation drivers 86, and the TEC 84, and controls both or one of the two light sources so that the wavelength of the light output from one light source of the two light sources approaches the wavelength of the light output from the other light source, at least based on the signal that is detected by the second PD 41 (the resonance monitor).

The temperature of the carrier 90 on which the optical semiconductor device 80 is installed is adjusted by the TEC 87. The signal (light output signal 95) from the two first PDs 40 placed between the two light sources and the ring resonator is input to the control circuit 82. The control circuit 82 detects the light output difference between the light outputs of each light source using the two light output signals 95. Moreover, the control circuit 82 outputs a control signal to the LD driver 85 configured to control the light output of the light source so as to have a desired light output, and the LD driver 85 feedback-controls the corresponding light source. Furthermore, the signal (the resonance signal 96) of the second PD 41 placed on the optical waveguide optically coupled with the ring resonator is input to the control circuit 82. The control circuit 82 detects the difference of the wavelengths of the beams of light oscillated by the two light sources having the different polarizations using the resonance signal 96, the control circuit 82 outputs a control signal to the wavelength control driver 84 configured to control the electric current flowing in the thin film resistor provided in the light source such that the difference of the wavelength is reduced up to the desired range, and the wavelength control driver 84 feedback-controls the corresponding light source. The control circuit 82 outputs a control signal to the modulation driver 86 configured to control the modulation area, based on the control signal 81 that is input from the outside, and the modulation driver applies a voltage (high frequency electrical signal) corresponding to a transmission signal to the modulation area. A polarization multiplexing light signal generated by a chip (the optical semiconductor device 80) is collimated by the collimate lens 88, then, is passed through the isolator 89, is condensed by the collimate lens 88 again, and is emitted to the outside from the optical fiber 92 placed at the output side. The terminals of the emitting sides of the beams of light of each electrode 18 of the four MZ modulators included in the modulation area 13 of the optical semiconductor device 80 illustrated in FIG. 5 are connected to the trailing end resistor 91.

In addition, the optical semiconductor device 80 mounted on the optical module illustrated in FIG. 13 may be replaced with the optical semiconductor device related to the sixth embodiment or the seventh embodiment. When the optical semiconductor device related to the sixth embodiment is mounted, the wavelength control driver 84 is connected to the front DBR mirror 61 and the rear DBR mirror 64 of the DBR-LD to perform the wavelength control. Similarly, when the optical semiconductor device related to the seventh embodiment is mounted, the wavelength control driver 84 is connected to the DBR mirror 71 and the LGLC filter 74 of the LGLC-LD to perform the wavelength control.

The wavelength control is performed by the following method. The wavelength difference of the light source is detected by superimposing the dither signals of the different frequencies on the signal controlling the light outputs of each light source and frequency-extracting the light output signal and the resonance signal. It is possible to bring the wavelengths of the beams of light output from the two light sources near each other by the feedback to the wavelength control driver depending on an amount of detection.

Specifically, the control circuit 82 outputs the control signal to the LD driver 85, and the LD driver 85 superimposes a first dither signal on a signal controlling the light output that is output from the first LD 11. Similarly, the LD driver 85 superimposes a second dither signal on a signal controlling the light output that is output from the second LD 12. Intensity of the light output from the first LD 11 and intensity of the light output from the second LD 12 are detected by extracting the resonance signal 96 detected by the second PD 41 at each frequency of the first dither signal and the second dither signal due to the difference between the frequency of the first dither signal and the frequency of the second dither signal. In addition, the wavelength control driver 84 adjusts the wavelength of the light that is output from the first LD 11, based on the detected intensity of the light that is output from the first LD 11. When changing the wavelength of the light, detected intensity of the light that is output from the first LD 11 is changed, and thus it is possible to set the wavelength of the light that is output from the first LD 11 to a predetermined range, by setting intensity of the light to the predetermined range depending on predetermined characteristics of the ring resonator. Similarly, it is possible to set the wavelength of the light that is output from the second LD 12 to a predetermined range, based on the detected intensity of the light that is output from the second LD 12. In this manner, it is possible to control the wavelengths of the beams of light that are each output from the first LD 11 and the second LD 12, and it is possible to control the wavelength of the light that is output from one light source so as to approach the wavelength of the light that is output from the other light source. Ideally, it is preferable that the wavelengths of the beams of light that are output from the two light sources coincide with each other. In addition, since neither of the first dither signal and the second dither signal affect the optical transmission signal quality, the signal of the frequency sufficiently lower than the baud rate of the modulation signal is preferable. It is possible to modulate intensities of the beams of light that are output from each light source in a range smaller than the intensity, by setting the amplitude of the dither signal to a predetermined value. For example, the first dither signal serving as the voltage signal of 2 kHz is superimposed on the LD electrode 15 of the first LD 11 configured to output the light having the TE polarization, and the second dither signal serving as the voltage signal of 3 kHz is superimposed on the LD electrode 15 of the second LD 12 configured to output the light having the TM polarization. It is possible to monitor the wavelength difference, by performing the frequency extraction of an amount of division in which the resonance signal 96 is divided by the light output signal 95. The wavelengths of the beams of light that are output from each light source can be controlled, by controlling the voltage (the signal controlling the optical intensity) applied to the LD electrodes of each light source, and setting the frequency-extracted signal to a certain signal value defined for each light source. For example, when setting the specific signal value to the peak value, the wavelength may be controlled so that the frequency-extracted signal is the maximum. Herein, although the dither signal is superimposed on the signal (the voltage signal) controlling the optical intensity, the signal does not necessarily need to be the voltage, but the signal controlling the light source may be used. For example, the dither signal may be superimposed on an amount of injection DC electric current (signal controlling the wavelength) to the thin film supply of the light source, and the signal suitable for the wavelength control method of the light source may be adopted.

In addition, herein, although both of the two light sources are the DFB-LDs including the resistor and the wavelength-tunable light sources, at least one thereof may be wavelength-tunable. For example, a case where the second light source is wavelength-tunable will be described. The first dither signal and the second dither signal are each superimposed on the signal controlling the optical outputs of the first light source and the second light source. By extracting the signal detected by the optical receiver (the second PD 41) at each of the frequencies of the first dither signal and the second dither signal, intensities of the beams of light that are each output from the first light source and the second light source are detected. The ring resonator is controlled so as to have predetermined characteristics corresponding to the wavelength of the first light source, based on detected intensity of the light that is output from the first LD 11. For example, the transmission wavelength of the ring resonator is controlled so that detected intensity of the light that is output from the first LD 11 is the maximum. Moreover, it is possible to set the wavelength of the light that is output from the second LD 12 to a predetermined range, by setting intensity of the light to a predetermined range according to predetermined characteristic of the ring resonator, based on the detected intensity of the light that is output from the second LD 12. In this manner, it is possible to control the wavelength of the light that is output from one light source so as to approach the wavelength of the light that is output from the other light source. Ideally, it is preferable that the wavelengths of the beams of light that are output from the two light sources coincide with each other. In addition, in this case, although the second dither signal is superimposed on the signal (the voltage signal) controlling the optical intensity, the signal does not necessarily need to be the voltage, but the signal controlling the light source may be used. For example, the dither signal may be superimposed on an amount of injection DC electric current (signal controlling the wavelength) to the thin film supply of the light source, and the signal suitable for the wavelength control method of the light source may be adopted.

Tenth Embodiment

Although a configuration of the optical module related to a tenth embodiment of the present invention is the same as that of the optical module related to the ninth embodiment, a method of controlling the wavelength is different from that of the ninth embodiment.

The wavelength control is performed by the following method. Each light source is controlled by a time division signal in which time slots different for each light source are allocated to signals controlling the outputs of the respective light sources. By detecting a light output signal and a resonance signal in synchronize with the time division signal, the wavelength difference of the light source is detected. By performing the feedback to the wavelength control driver depending on the amount of detection, it is possible to allow the wavelength of the light that is output from one light source to approach the wavelength of the light that is output from the other light source.

Specifically, the wavelengths of the beams of light that are output from the two light sources approach each other, by controlling the wavelength of the light that is output from the first LD 11 so as to be within a predetermined range with respect to the transmission wavelength (the resonance wavelength) of the ring resonator, in the time slot corresponding to the first LD 11, and by controlling the wavelength of the light that is output from the second LD 12 so as to be within a predetermined range with respect to the transmission wavelength of the ring resonator, in the time slot corresponding to the second LD 12. Ideally, the wavelengths of the beams of light that are output from the first LD 11 and the second LD 12 are allowed to coincide with each other, by allowing the wavelength of the light that is output from the first LD 11 to coincide with the transmission wavelength of the ring resonator, and allowing the wavelength of the light that is output from the second LD 12 to coincide with the transmission wavelength of the ring resonator.

By setting a bias voltage applied to each of the first PD 40 (first optical intensity receiver) connected to the first LD 11 and the first PD 40 (second optical intensity receiver) connected to the second LD 12 to a predetermined voltage, it is possible to control intensity of the light that is penetrated through the first optical intensity receiver and transmitted through the first optical waveguide 44A, and intensity of the light that penetrates through the second optical intensity receiver and transmitted through the second optical waveguide 44B. Thereby, intensity of the light transitioned to the ring resonator from each optical waveguide is changed, and the optical intensity detected in the second PD 41 is changed.

In the time slot corresponding to the first LD 11, the bias voltages applied to each first PD 40 serving as the first optical intensity receiver and the second optical intensity receiver are set to predetermined bias voltages for detecting the wavelength of the first LD 11. For example, by setting the bias voltage of the first optical intensity receiver to 0 V, and the bias voltage of the second optical intensity receiver to −3 V as the predetermined bias voltage, while maintaining intensity of the light that is output from the back of the second LD 12, penetrated through the first PD 40 and transmitted through the second optical waveguide 44B at an intensity that has little influence on the detection, it is possible to increase intensity of the light that is output from the back of the first LD 11, penetrated through the first LD 11 and transmitted through the first optical waveguide 44A to intensity enough for detection. In addition, since intensity of the light itself that is output from the first LD 11 is not changed, the output of the modulation signal that is output from the first LD 11 and guided through the modulation area 13 is constantly kept. By setting the bias voltages of the first optical intensity receiver and the second optical intensity receiver as a predetermined bias voltage to 0 V and −3 V, respectively, in intensity of the resonance signal detected by the second PD 41, the signal intensity of the light from the first LD 11 becomes dominant. For this reason, it is possible to monitor the wavelength of the light that is output from the first LD 11 by an amount of division in which the resonance signal detected by the second PD 41 is divided by the output signal detected in the previous time slot. In the time slot corresponding to the first LD 11, by controlling the amount of injection electric current (signal that controls the wavelength) of the first LD 11 to the thin film resistor 16, and setting the resonance signal intensity to a certain specific signal value defined for each light source, it is possible to control the wavelength of the light that is output from the first LD 11 within a predetermined range (within a predetermined range with respect to the transmission wavelength) corresponding to the characteristics of the ring resonator.

Similarly, in the time slot corresponding to the second LD 12, by setting the bias voltage of the first PD 40 serving as the first optical intensity receiver and the second optical intensity receiver to a predetermined bias voltage for detecting the wavelength of the second LD 12, it is also possible to control the wavelength of the light that is output from the second LD 12 to a predetermined range (within a predetermined range with respect to the transmission wavelength) corresponding to the characteristics of the ring resonator, by the wavelength control in the same sequence. Thereby, it is possible to allow the wavelengths of the beams of light output from the two light sources to approach each other. In addition, herein, as a predetermined bias voltage for detecting the wavelength of the second LD 12, for example, on the contrary to a predetermined bias for detecting the wavelength of the first LD 11, the bias voltage of the first optical intensity receiver may be set to −3 V, and the bias voltage of the second optical intensity receiver may be set to 0 V.

In addition, herein, although both of the two light sources are the DFB-LDs including the resistor, and the wavelength-tunable light source, at least one thereof may be wavelength-tunable. For example, a case where the second light source is wavelength-tunable will be described. In the time slot corresponding to the first light source, the bias voltages applied to each of the first optical intensity receiver and the second optical intensity receiver are set to predetermined bias voltages for detecting the wavelength of the first light source. The ring resonator is controlled so as to have predetermined characteristics corresponding to the wavelength of the first light source, based on the resonance signal detected by the optical receiver (the second PD 41). For example, the transmission wavelength of the ring resonator is controlled so that the resonance signal detected by the optical receiver (the second PD 41) is the maximum. Moreover, in the time slot corresponding to the second light source, the bias voltages applied to each of the first optical intensity receiver and the second optical intensity receiver are set to predetermined bias voltages for detecting the wavelength of the second light source. It is possible to control the wavelength of the light that is output from the second light source to a predetermined range (within a predetermined range with respect to the transmission wavelength) corresponding to the characteristics of the ring resonator based on the resonance signal detected by the optical receiver (the second PD 41), and thereby it is possible to set the wavelength of the second light source within a predetermined range with respect to the wavelength of the first light source.

Eleventh Embodiment

Although a configuration of an optical module related to an eleventh embodiment of the present invention is the same as that of the optical module related to the ninth and tenth embodiments, a method of controlling the wavelength is different from the ninth and tenth embodiments.

When causing the beams of light having the slightly different wavelengths to interfere with each other, a beat signal is generated which sets the difference in frequency to a frequency. The wavelength control extracts the beat signal generated by the interference of the light that is output from the two light sources in the ring resonator, from the signal detected by the optical receiver (the second PD 41). The wavelength difference in the respective light sources is reduced by performing the feedback of the beat signal to the wavelength control driver. The smaller the wavelength difference is, the greater the peak intensity of the beat signal is. Herein, intensity of the beat signal is the maximum when the wavelengths of all the light sources are superimposed on the FSR peak of the ring resonator. For that reason, it is possible to allow the wavelengths to coincide with each other by controlling the wavelengths of each light source so that the resonance signal is the maximum.

Specifically, the amount of injection electric current (signal controlling the wavelength) of the first LD 11 to the thin film resistor 16 is controlled so that the resonance signal intensity is the maximum. At this time, the FSR peak of the ring resonator and the wavelength of the light output from the first LD 11 become within a predetermined range, and ideally, the wavelength of the light output from the first LD 11 coincides with the transmission wavelength of the ring resonator. Next, the amount of injection electric current of the second LD 12 to the thin film resistor 16 is controlled so that the resonance signal intensity is the maximum. At this time, the FSR peak of the ring resonator and the wavelength of the light output from the second LD 12 become within a predetermined range, and, ideally, the wavelength of the light output from the second LD 12 coincides with the transmission wavelength of the ring resonator. Thus, the wavelengths of the beams of light output from each of the first LD 11 and the second LD 12 become within a predetermined range, and ideally, coincide with each other.

In addition, herein, although both of the two light sources are the DFB-LDs including the resistor, and the wavelength-tunable light sources, at least one thereof may be wavelength-tunable, and the wavelength of the light output from the wavelength-tunable light source may be controlled so as to approach the wavelength of the light output from the other light source, based on the resonance signal detected by the optical receiver (the second PD 41).

The optical modules related to the ninth to eleventh embodiments have been described above. The high capacity optical module is provided by the optical modules related to the ninth to eleventh embodiments, without raising the baud rate. The optical modules related to the ninth to the eleventh embodiments do not need implementation optical components such as a polarization rotator that has been used in the related art, and reduces the implementation process and the optical loss. In addition, in the optical modules related to the ninth to eleventh embodiments, it is possible to realize optical modules having a stable transmission property such as Ethernet (registered trademark) and interconnects that have relatively small size, low cost, low electric power consumption, and high capacity for a relatively short distance. In addition, as the optical module, if a module includes the optical semiconductor device related to the present invention, the module can be widely applied, without being limited to the optical module illustrated in FIG. 13. That is, the optical module includes an optical transmission module and an optical transporting module.

What is claimed is:

1. An optical semiconductor device in which a first light source, a second light source, a first optical modulator, a second optical modulator, and an optical multiplexer are integrated together on a semiconductor substrate, wherein:
the first light source outputs light having a first polarization,
the second light source outputs light having a second polarization different from the first polarization,
the first optical modulator is optically connected to an output side of the first light source and modulates the light that is output from the first light source to output a light signal,
the second optical modulator is optically connected to an output side of the second light source and modulates the light that is output from the second light source to output a light signal,
the optical multiplexer couples the light signal that is output from the first optical modulator with the light signal that is output from the second optical modulator to output a coupled light signal,
at least one of the first light source and the second light source is a wavelength-tunable laser, and
the first light source and the second light source are able to allow a wavelength of the light that is output from one light source of the first light source and the second light source to approach a wavelength of the light that is output from the other light source thereof.

2. The optical semiconductor device according to claim 1, wherein the wavelength-tunable laser is a distribution feedback type laser that includes a resistor for adjusting the wavelength of the light to be output by a temperature.

3. The optical semiconductor device according to claim 1, wherein the wavelength-tunable laser is a distributed Bragg reflector type laser or a lateral grating assisted lateral co-directional coupler type laser.

4. An optical module comprising the optical semiconductor device according to claim 1.

5. An optical semiconductor device in which a first light source, a second light source, a first optical modulator, a second optical modulator, and an optical multiplexer are integrated together on a semiconductor substrate, wherein:
the first light source outputs light having a first polarization, the second light source outputs light having a second polarization different from the first polarization,
the first optical modulator is optically connected to an output side of the first light source and modulates the light that is output from the first light source to output a light signal,
the second optical modulator is optically connected to an output side of the second light source and modulates the light that is output from the second light source to output a light signal, and
the optical multiplexer couples the light signal that is output from the first optical modulator with the light signal that is output from the second optical modulator to output a coupled light signal,
the optical semiconductor device further comprising:
an element having wavelength dependence that is optically connected to each of the first light source and the second light source, and detects whether or not there is a difference in wavelengths of the beams of light that are each output from the first light source and the second light source; and
an optical receiver that is optically connected to the element having the wavelength dependence, and detects the light so that the element converts the beams of light that are each output from the first light source and the second light source.

6. The optical semiconductor device according to claim 5, wherein the element having the wavelength dependence is any one of a ring resonator and a Mach-Zehnder type delay interferometer.

7. The optical semiconductor device according to claim 5, wherein the element having the wavelength dependence is a ring resonator, and the optical semiconductor device further comprises:
   a first optical waveguide that is optically connected to the first light source;
   a second optical waveguide that is optically connected to the second light source;
   a first multi-mode interference type multiplexer/demultiplexer that optically couples the first optical waveguide with the ring resonator; and
   a second multi-mode interference type multiplexer/demultiplexer that optically couples the second optical waveguide with the ring resonator.

8. The optical semiconductor device according to claim 7, wherein effective refractive indices of the first multi-mode interference type multiplexer/demultiplexer and the second multi-mode interference type multiplexer/demultiplexer are changed along an optical axial direction.

9. An optical module comprising: the optical semiconductor device according to claim 5; and
   a control unit that controls the first light source and/or the second light source so as to allow the wavelength of the light that is output from one light source of the first light source and the second light source to approach the wavelength of the light that is output from the other light source thereof, based on a signal detected by the optical receiver.

10. The optical module according to claim 9, wherein:
the second light source is a wavelength-tunable laser,
the control unit superimposes a first dither signal on a signal for controlling a light output of the first light source, extracts a signal detected by the optical receiver at a frequency of the first dither signal, and controls the element having the wavelength dependence so as to have predetermined characteristics corresponding to the wavelength of the first light source, and
the control unit superimposes a second dither signal having a frequency different from that of the first dither signal on a signal for controlling the second light source, extracts the signal detected by the optical receiver at a frequency of the second dither signal, and controls the wavelength of the second light source so as to be within a predetermined range corresponding to the predetermined characteristics of the element having the wavelength dependence.

11. The optical module according to claim 9, wherein:
the first light source and the second light source are wavelength-tunable lasers, and
the control unit superimposes a first dither signal on a signal for controlling the first light source, superimposes a second dither signal having a frequency different from that of the first dither signal on a signal for controlling the second light source, extracts a signal detected by the optical receiver at the frequency of the first dither signal and the frequency of the second dither signal, respectively, and controls the wavelength of the first light source and the wavelength of the second light source so as to be within a predetermined range corresponding to the predetermined characteristics of the element having the wavelength dependence, respectively.

12. The optical module according to claim 9,
wherein the second light source is a wavelength-tunable laser,
the optical semiconductor device further comprises:
a first optical intensity receiver that is optically connected to the first light source on a side of the first light source opposite to the first optical modulator, and detects intensity of the light that is output from the first light source; and
a second optical intensity receiver that is optically connected to the second light source on a side of the second light source opposite to the second optical modulator, and detects intensity of the light that is output from the second light source,
wherein the control unit applies a predetermined bias voltage for detecting the wavelength of the first light source to each of the first optical intensity receiver and the second optical intensity receiver in a time slot corresponding to the first light source, and controls the element having the wavelength dependence so as to have predetermined characteristics corresponding to the wavelength of the first light source based on the signal detected by the optical receiver, and
wherein the control unit applies a predetermined bias voltage for detecting the wavelength of the second light source to each of the first optical intensity receiver and the second optical intensity receiver in a time slot corresponding to the second light source, and controls the wavelength of the second light source so as to be within a predetermined range corresponding to the predetermined characteristics of the element having the wavelength dependence, based on the signal detected by the optical receiver.

13. The optical module according to claim 9,
wherein both of the first light source and the second light source are wavelength-tunable lasers,
the optical semiconductor device further comprises:
a first optical intensity receiver that is optically connected to the first light source at a side of the first light source opposite to the first optical modulator, and detects intensity of the light that is output from the first light source; and a second optical intensity receiver that is optically connected to the second light source at a side of the second light source opposite to the second optical modulator, and detects intensity of the light that is output from the second light source, wherein the control unit applies a predetermined bias voltage for detecting the wavelength of the first light source to each of the first optical intensity receiver and the second optical intensity receiver in a time slot corresponding to the first light source, and controls the wavelength of the light that is output from the first light source so as to be within a predetermined range corresponding to the characteristics of the element having the wavelength dependence based on the signal detected by the optical receiver, and wherein the control unit applies a predetermined bias voltage for detecting the wavelength of the second light source to each of the first optical intensity receiver and the second optical intensity receiver in a time slot corresponding to the second light source, and controls the wavelength of the light that is output from the second light source so as to be within a predetermined range corresponding to the characteristics of the element having the wavelength dependence, based on the signal detected by the optical receiver.

14. The optical module according to claim 9, wherein:
both of the first light source and the second light source are wavelength-tunable lasers, and
the control unit extracts a beat signal generated by interference between the light that is output from the first light source and the light that is output from the second light source in the element having the wavelength dependence, from the signal detected by the optical receiver, and controls the wavelength of the first light source and the wavelength of the second light source so as to each be within a predetermined range corresponding to the predetermined characteristics of the element having the wavelength dependence.

15. An optical module comprising the optical semiconductor device according to claim 5.

* * * * *